United States Patent
Engelberg et al.

(10) Patent No.: US 12,231,461 B2
(45) Date of Patent: Feb. 18, 2025

(54) PRIORITIZING SECURITY CONTROLS USING A CYBER DIGITAL TWIN SIMULATOR

(71) Applicant: Accenture Global Solutions Limited, Dublin (IE)

(72) Inventors: Gal Engelberg, Pardes-hana (IL); Dan Klein, Rosh Ha'ayin (IL); Alexander Basovskiy, Hod Ha'sharon (IL); Nimrod Busany, Tel Aviv (IL)

(73) Assignee: Accenture Global Solutions Limited, Dublin (IE)

( * ) Notice: Subject to any disclaimer, the term of this patent is extended or adjusted under 35 U.S.C. 154(b) by 308 days.

(21) Appl. No.: 17/818,784

(22) Filed: Aug. 10, 2022

(65) Prior Publication Data
US 2023/0067128 A1    Mar. 2, 2023

Related U.S. Application Data

(60) Provisional application No. 63/232,399, filed on Aug. 12, 2021.

(51) Int. Cl.
*H04L 9/40* (2022.01)
(52) U.S. Cl.
CPC ...... *H04L 63/1441* (2013.01); *H04L 63/1425* (2013.01)
(58) Field of Classification Search
CPC .................. H04L 63/1425; H04L 63/1441
See application file for complete search history.

(56) References Cited

U.S. PATENT DOCUMENTS

| 5,521,910 A | 5/1996 | Matthews |
| 6,279,113 B1 | 8/2001 | Vaidya |
| (Continued) | | |

FOREIGN PATENT DOCUMENTS

| EP | 1559008 | 8/2005 |
| EP | 1768043 | 3/2007 |
| (Continued) | | |

OTHER PUBLICATIONS

Gehrmann, Christian, and Martin Gunnarsson. "A digital twin based industrial automation and control system security architecture." IEEE Transactions on Industrial Informatics 16.1 (2019): 669-680 (Year: 2019).*

(Continued)

*Primary Examiner* — Syed A Zaidi
(74) *Attorney, Agent, or Firm* — Polsinelli PC

(57) ABSTRACT

Implementations include a computer-implemented method for mitigating cyber security risk of an enterprise network, the method comprising: receiving an analytical attack graph (AAG) representing paths within the enterprise network with respect to at least one target asset, the AAG defining a digital twin of the enterprise network and comprising a set of rule nodes, each rule node representing an attack tactic that can be used to move along a path of the AAG; integrating the AAG with a knowledge graph comprising a set of asset nodes, each asset node representing a digital asset that can be affected by one or more of the attack tactics; determining, based on integrating the AAG with the knowledge graph, a plurality of security controls, each security control having an assigned priority value; and selectively implementing the security controls in the enterprise network based on the assigned priority values of the security controls.

17 Claims, 15 Drawing Sheets

(56) References Cited

U.S. PATENT DOCUMENTS

| | | | |
|---|---|---|---|
| 6,487,666 B1 | 11/2002 | Shanklin et al. | |
| 7,540,025 B2 | 5/2009 | Tzadikario | |
| 7,703,138 B2 | 4/2010 | Desai et al. | |
| 7,904,962 B1 | 3/2011 | Jajodia et al. | |
| 8,099,760 B2 | 1/2012 | Cohen et al. | |
| 8,176,561 B1 | 5/2012 | Hurst et al. | |
| 8,656,493 B2 | 2/2014 | Capalik | |
| 8,881,288 B1 | 11/2014 | Levy et al. | |
| 9,100,430 B1* | 8/2015 | Seiver | H04L 63/101 |
| 9,256,739 B1 | 2/2016 | Roundy et al. | |
| 9,467,455 B2* | 10/2016 | Seiver | H04L 41/12 |
| 9,563,771 B2 | 2/2017 | Lang et al. | |
| 9,633,306 B2 | 4/2017 | Liu et al. | |
| 9,648,036 B2* | 5/2017 | Seiver | H04L 43/0876 |
| 10,084,804 B2 | 9/2018 | Kapadia et al. | |
| 10,291,645 B1 | 5/2019 | Frantzen et al. | |
| 10,382,473 B1 | 8/2019 | Ashkenazy et al. | |
| 10,447,721 B2 | 10/2019 | Lasser | |
| 10,447,727 B1 | 10/2019 | Hecht | |
| 10,601,854 B2 | 3/2020 | Lokamathe et al. | |
| 10,642,840 B1 | 5/2020 | Attaluri et al. | |
| 10,659,488 B1 | 5/2020 | Rajasooriya et al. | |
| 10,771,492 B2 | 9/2020 | Hudis et al. | |
| 10,848,515 B1 | 11/2020 | Pokhrel et al. | |
| 10,868,825 B1 | 12/2020 | Dominessy et al. | |
| 10,873,533 B1 | 12/2020 | Ismailsheriff et al. | |
| 10,956,566 B2 | 3/2021 | Shu et al. | |
| 10,958,667 B1 | 3/2021 | Maida et al. | |
| 11,089,040 B2 | 8/2021 | Jang et al. | |
| 11,128,654 B1 | 9/2021 | Joyce et al. | |
| 11,159,555 B2 | 10/2021 | Hadar et al. | |
| 11,184,385 B2 | 11/2021 | Hadar et al. | |
| 11,232,235 B2 | 1/2022 | Hadar et al. | |
| 11,277,431 B2 | 3/2022 | Hassanzadeh et al. | |
| 11,281,806 B2 | 3/2022 | Hadar et al. | |
| 11,283,824 B1 | 3/2022 | Berger et al. | |
| 11,283,825 B2 | 3/2022 | Grabois et al. | |
| 11,411,976 B2 | 8/2022 | Basovskiy et al. | |
| 11,483,213 B2 | 10/2022 | Engelberg et al. | |
| 11,533,332 B2 | 12/2022 | Engelberg et al. | |
| 2005/0138413 A1 | 6/2005 | Lippmann et al. | |
| 2005/0193430 A1 | 9/2005 | Cohen et al. | |
| 2006/0037077 A1 | 2/2006 | Gadde et al. | |
| 2008/0044018 A1 | 2/2008 | Scrimsher et al. | |
| 2008/0289039 A1 | 11/2008 | Rits et al. | |
| 2008/0301765 A1 | 12/2008 | Nicol et al. | |
| 2009/0077666 A1 | 3/2009 | Chen et al. | |
| 2009/0138590 A1 | 5/2009 | Lee et al. | |
| 2009/0307772 A1 | 12/2009 | Markham et al. | |
| 2009/0319248 A1 | 12/2009 | White et al. | |
| 2010/0058456 A1 | 3/2010 | Jajodia et al. | |
| 2010/0138925 A1 | 7/2010 | Barai et al. | |
| 2010/0174670 A1 | 7/2010 | Malik et al. | |
| 2011/0035803 A1 | 2/2011 | Lucangeli Obes et al. | |
| 2011/0061104 A1 | 3/2011 | Sarraute Yamada et al. | |
| 2011/0093916 A1 | 4/2011 | Lang et al. | |
| 2011/0093956 A1 | 4/2011 | Laarakkers et al. | |
| 2013/0097125 A1 | 4/2013 | Marvasti et al. | |
| 2013/0219503 A1 | 8/2013 | Amnon et al. | |
| 2014/0082738 A1 | 3/2014 | Bahl | |
| 2014/0173740 A1 | 6/2014 | Albanese et al. | |
| 2015/0047026 A1 | 2/2015 | Neil et al. | |
| 2015/0106867 A1 | 4/2015 | Liang | |
| 2015/0199207 A1 | 7/2015 | Lin et al. | |
| 2015/0261958 A1 | 9/2015 | Hale et al. | |
| 2015/0326601 A1 | 11/2015 | Grondin et al. | |
| 2015/0350018 A1 | 12/2015 | Hui et al. | |
| 2016/0105454 A1* | 4/2016 | Li | H04L 63/1416 726/23 |
| 2016/0205122 A1 | 7/2016 | Bassett | |
| 2016/0277423 A1 | 9/2016 | Apostolescu et al. | |
| 2016/0292599 A1 | 10/2016 | Andrews et al. | |
| 2016/0301704 A1 | 10/2016 | Hassanzadeh et al. | |
| 2016/0301709 A1 | 10/2016 | Hassanzadeh et al. | |
| 2017/0012836 A1 | 1/2017 | Tongaonkar et al. | |
| 2017/0032130 A1 | 2/2017 | Joseph et al. | |
| 2017/0041334 A1 | 2/2017 | Kahn et al. | |
| 2017/0078322 A1 | 3/2017 | Seiver et al. | |
| 2017/0085595 A1 | 3/2017 | Ng et al. | |
| 2017/0163506 A1 | 6/2017 | Keller | |
| 2017/0230410 A1 | 8/2017 | Hassanzadeh et al. | |
| 2017/0244745 A1* | 8/2017 | Key | H04L 63/1425 |
| 2017/0318050 A1 | 11/2017 | Hassanzadeh et al. | |
| 2017/0324768 A1 | 11/2017 | Crabtree et al. | |
| 2017/0364702 A1 | 12/2017 | Goldfarb et al. | |
| 2017/0366416 A1 | 12/2017 | Beecham et al. | |
| 2018/0013771 A1 | 1/2018 | Crabtree et al. | |
| 2018/0103052 A1 | 4/2018 | Choudhury et al. | |
| 2018/0152468 A1 | 5/2018 | Nor et al. | |
| 2018/0159890 A1 | 6/2018 | Warnick et al. | |
| 2018/0183827 A1 | 6/2018 | Zorlular et al. | |
| 2018/0255077 A1 | 9/2018 | Paine | |
| 2018/0255080 A1 | 9/2018 | Paine | |
| 2018/0295154 A1 | 10/2018 | Crabtree et al. | |
| 2018/0367548 A1 | 12/2018 | Stokes, III et al. | |
| 2019/0052663 A1 | 2/2019 | Lee et al. | |
| 2019/0052664 A1 | 2/2019 | Kibler et al. | |
| 2019/0132344 A1 | 5/2019 | Lem et al. | |
| 2019/0141058 A1 | 5/2019 | Hassanzadeh et al. | |
| 2019/0182119 A1 | 6/2019 | Ratkovic et al. | |
| 2019/0182273 A1* | 6/2019 | Walsh | H04L 63/1425 |
| 2019/0188389 A1 | 6/2019 | Peled et al. | |
| 2019/0230129 A1 | 7/2019 | Digiambattista et al. | |
| 2019/0312898 A1 | 10/2019 | Verma et al. | |
| 2019/0319987 A1 | 10/2019 | Levy et al. | |
| 2019/0362279 A1 | 11/2019 | Douglas | |
| 2019/0373005 A1 | 12/2019 | Bassett | |
| 2020/0014718 A1 | 1/2020 | Joseph Durairaj et al. | |
| 2020/0042328 A1 | 2/2020 | Gupta | |
| 2020/0042712 A1 | 2/2020 | Foo et al. | |
| 2020/0045069 A1 | 2/2020 | Nanda et al. | |
| 2020/0099704 A1 | 3/2020 | Lee et al. | |
| 2020/0112487 A1 | 4/2020 | Inamdar et al. | |
| 2020/0128047 A1 | 4/2020 | Biswas et al. | |
| 2020/0137104 A1 | 4/2020 | Hassanzadeh et al. | |
| 2020/0175175 A1 | 6/2020 | Hadar et al. | |
| 2020/0177615 A1* | 6/2020 | Grabois | H04L 63/20 |
| 2020/0177616 A1 | 6/2020 | Hadar et al. | |
| 2020/0177617 A1 | 6/2020 | Hadar et al. | |
| 2020/0177618 A1 | 6/2020 | Hassanzadeh et al. | |
| 2020/0177619 A1 | 6/2020 | Hadar et al. | |
| 2020/0272972 A1 | 8/2020 | Harry et al. | |
| 2020/0296137 A1 | 9/2020 | Crabtree et al. | |
| 2020/0311630 A1 | 10/2020 | Risoldi et al. | |
| 2020/0351295 A1 | 11/2020 | Nhlabatsi et al. | |
| 2020/0358804 A1 | 11/2020 | Crabtree et al. | |
| 2021/0006582 A1 | 1/2021 | Yamada et al. | |
| 2021/0014265 A1 | 1/2021 | Hadar et al. | |
| 2021/0099490 A1 | 4/2021 | Crabtree et al. | |
| 2021/0105294 A1 | 4/2021 | Kruse et al. | |
| 2021/0168175 A1 | 6/2021 | Crabtree et al. | |
| 2021/0173711 A1 | 6/2021 | Crabtree et al. | |
| 2021/0218770 A1 | 7/2021 | Ben-Yosef et al. | |
| 2021/0248443 A1 | 8/2021 | Shu et al. | |
| 2021/0273978 A1 | 9/2021 | Hadar et al. | |
| 2021/0288995 A1 | 9/2021 | Attar et al. | |
| 2021/0336981 A1 | 10/2021 | Akella et al. | |
| 2021/0409426 A1 | 12/2021 | Engelberg et al. | |
| 2021/0409439 A1 | 12/2021 | Engelberg et al. | |
| 2022/0014445 A1 | 1/2022 | Engelberg et al. | |
| 2022/0014534 A1 | 1/2022 | Basovskiy et al. | |
| 2022/0021698 A1 | 1/2022 | Hadar et al. | |
| 2022/0038491 A1 | 2/2022 | Hadar et al. | |
| 2022/0051111 A1 | 2/2022 | Hadar et al. | |
| 2022/0070202 A1 | 3/2022 | Busany et al. | |
| 2022/0124115 A1 | 4/2022 | Grabois et al. | |
| 2022/0129590 A1 | 4/2022 | Hadar et al. | |
| 2022/0131894 A1 | 4/2022 | Hassanzadeh et al. | |
| 2022/0150270 A1 | 5/2022 | Klein et al. | |
| 2022/0159033 A1* | 5/2022 | Mizrahi | H04L 63/1441 |
| 2022/0182406 A1 | 6/2022 | Inokuchi | |
| 2022/0188460 A1 | 6/2022 | Hadar et al. | |
| 2022/0263855 A1 | 8/2022 | Engelberg et al. | |
| 2022/0337617 A1 | 10/2022 | Basovskiy et al. | |

(56) References Cited

U.S. PATENT DOCUMENTS

| | | | |
|---|---|---|---|
| 2023/0021961 | A1 | 1/2023 | Engelberg et al. |
| 2023/0034910 | A1 | 2/2023 | Engelberg et al. |
| 2023/0067777 | A1 | 3/2023 | Hadar et al. |
| 2023/0076372 | A1 | 3/2023 | Engelberg et al. |

FOREIGN PATENT DOCUMENTS

| | | |
|---|---|---|
| EP | 2385676 | 11/2011 |
| EP | 2816773 | 12/2014 |
| EP | 3644579 | 4/2020 |
| EP | 3664411 | 6/2020 |
| WO | WO 2018/002484 | 1/2018 |
| WO | WO 2020/242275 | 12/2020 |

OTHER PUBLICATIONS

Yusuf, Simon Enoch, et al. "Security modelling and analysis of dynamic enterprise networks." 2016 IEEE International Conference on Computer and Information Technology (CIT). IEEE, 2016 (Year: 2016).*

Turtiainen H, Costin A, Hämäläinen T. Defensive machine learning methods and the cyber defence chain. InArtificial Intelligence and Cybersecurity: Theory and Applications Aug. 1, 2022 (pp. 147-163). Cham: Springer International Publishing (Year: 2022).*

Kaloroumakis PE, Smith MJ. Toward a knowledge graph of cybersecurity countermeasures. The MITRE Corporation. 2021;11:2021 (Year: 2021).*

NPL Search Terms (Year: 2024).*

3DS.com [online], "New Customer Experience," available on or before Aug. 7, 2020 via Internet Archive: Wayback Machine URL<https://web.archive.org/web/20200807204455/https://ifwe.3ds.com/transportation-mobility/new-customer-experience>, retrieved on Jul. 9, 2021, retrieved from URL<https://ifwe.3ds.com/transportation-mobility/new-customer-experience>, 9 pages.

Abraham et al. "A Predictive Framework for Cyber Security Analytics Using Attack Graphs." International Journal of Computer Networks & Communications (IJCNC). vol. 7, No. 1, Jan. 2015. (Year: 2015).

Abraham et al., "Cyber Security Analytics: A Stochastic Model for Security Quantification Using Absorbing Markov Chains," Journal of Communications, Dec. 2014, 9(12):899-907.

Almeida et al., "An ontological analysis of the notion of community in the RM-ODP enterprise language," Computer Standards & Interfaces, Mar. 2013, 35(3):257-268.

Alvarenga et al., "Discovering Attack Strategies Using Process Mining," Presented at Proceedings of the Eleventh Advanced International Conference on Telecommunications, Brussels, Belgium, Jun. 21-26, 2015, 119-125.

Amar et al., "Using finite-state models for log differencing," Proceedings of the 2018 26th ACM Joint Meeting on European Software Engineering Conference and Symposium on the Foundations of Software Engineering (ESEC/FSE 2018), Lake Buena Vista, Florida, Nov. 4-9, 2018, 49-59.

Annane et al., "BBO: BPMN 2.0 based ontology for business process representation," Presented at Proceedings of the 20th European Conference on Knowledge Management (ECKM 2019), Lisbonne, Portugal, Sep. 5-6, 2019, 49-59.

Ashton et al., "That 'internet of things' thing," RFID Journal, Jun. 22, 2009, 1 page.

Atoum et al., "A holistic cyber security implementation framework," Information Management & Computer Security, Jul. 2014, 22(3):251-264.

Barik et al., "Attack Graph Generation and Analysis Techniques," Defence Science Journal, Nov. 2016, 66(6):559-567.

Barrère et al., "Naggen: a Network Attack Graph GENeration Tool—IEE CNS 17 Poster," 2017 IEEE Conference on Communications and Network Security, Oct. 2017, Las Vegas, NV, USA, 378-379.

Bonacich, "Power and Centrality: A Family of Measures," American Journal of Sociology, Mar. 1987, 92(5):1170-1182.

Borgatti et al., "A Graph-theoretic perspective on centrality," Social Networks, Oct. 2006, 28(4):466-484.

Borgo et al., "Ontological Foundations of Dolce," Theory and Applications of Ontology: Computer Applications, Aug. 5, 2010, 279-295.

Brazhuk, "Towards automation of threat modeling based on a semantic model of attack patterns and weaknesses," arXiv, Dec. 8, 2021, arXiv:2112.04231v1, 14 pages.

Burger et al., "Scaling to the end of silicon with edge architectures," Computer, Jul. 2004, 37(7):44-55.

Challenge.org [online], "Incorporating digital twin into internet cyber security—creating a safer future," May 2018, retrieved on Jul. 9, 2021, retrieved from URL<https://www.challenge.org/insights/digital-twin-cyber-security/>, 10 pages.

Chen et al., "Distributed Attack Modeling Approach Based on Process Mining and Graph Segmentation," Entropy, Sep. 2020, 22(9):1026, 21 pages.

Cohen-Addad et al., "Hierarchical Clustering: Objective Functions and Algorithms," Journal of the ACM, Jun. 2019, 66(4):26, 42 pages.

Coltellese et al., ""Triage of IoT Attacks Through Process Mining,"" Presented at Proceedings of on the Move to Meaningful Internet Systems Conference 2019, Rhodes, Greece, Oct. 21-25, 2019; Lecture Notes in Computer Science, Oct. 2019, 11877:326-344.

Cravero, "Big data architectures and the internet of things: A systematic mapping study," IEEE Latin America Transactions, Apr. 2018, 16(4):1219-1226.

CyberSecurity Works.com [online], "MITRE Mapping of CISA KEVs and its Challenges," Jun. 29, 2022, retrieved on Oct. 4, 2022, retrieved from URL<https://cybersecurityworks.com/blog/cisa/mitre-mapping-of-cisa-kevs-and-its-challenges.html>, 6 pages.

Cycognito.com [online], "Identifying and Managing Vulnerabilities on All Your Attacker-Exposed Assets, All the Time: Benefits of the CyCognito Platform for Vulnerability Management," available on or before Oct. 22, 2020 via Internet Archive: Wayback Machine URL<https://web.archive.org/web/20201022120625/https://www.cycognito.com/vulnerability-management>, retrieved on Oct. 4, 2022, retrieved from URL<https://www.cycognito.com/vulnerability-management>, 15 pages.

Daniele et al., "An ontological approach to logistics," Enterprise Interoperability: Research and Applications in the Service-oriented Ecosystem, Oct. 11, 2013, 199-213.

Das et al., "V2W-BERT: A Framework for Effective Hierarchical Multiclass Classification of Software Vulnerabilities," CoRR, submitted on Feb. 23, 2021, arXiv:2102.11498v1, 11 pages.

Degen et al., "Gol: toward an axiomatized upper-level ontology," Presented at Proceedings of the International Conference on Formal Ontology in Information Systems, Ogunquit, Maine, USA, Oct. 17-19, 2001, 34-46.

Duarte et al., "Towards an Ontology of Requirements at Runtime," Formal Ontology in Information Systems, Jan. 2016, 283:255-268.

El Saddik, "Digital Twins: The Convergence of Multimedia Technologies," IEEE MultiMedia, Apr.-Jun. 2018, 25(2):87-92.

EP Extended Search Report in European Appln. No. 21191752.1, dated Jan. 4, 2022, 8 pages.

EP Extended Search Report in European Appln. No. 22157487.4, dated Jun. 9, 2022, 10 pages.

EP Search Report in European Application No. EP 19212981, dated Mar. 4, 2020, 6 pages.

EP Search Report in European Application No. EP13290145, dated Nov. 12, 2013, 2 pages.

EP Search Report in European Application No. EP19212974, dated Feb. 14, 2020, 8 pages.

EP Search Report in European Application No. EP19212976, dated Feb. 14, 2020, 8 pages.

EP Search Report in European Application. No. 21159421.3, dated Jun. 30, 2021, 11 pages.

EP Search Report in European Application. No. EP20185251, dated Oct. 21, 2020, 7 pages.

(56) References Cited

OTHER PUBLICATIONS

Fielder et al., "Decision support approaches for cyber security investment," Decision Support Systems, Jun. 2016, 86:13-23.

Foundations of Databases, 1st ed., Abiteboul et al. (eds.), 1995, Chapter 12, 38 pages.

Fundamentals of Business Process Management, 2nd ed., Dumas et al. (eds.), 2018, 546 pages.

Gailly et al., "Ontological Reengineering of the REA-EO using UFO," Presented at Proceedings of the International Workshop on Ontology-Driven Software Engineering, Orlando, FL, USA, Oct. 2009, 15 pages.

Gandomi et al., "Beyond the hype: Big data concepts, methods, and analytics," International Journal of Information Management, Apr. 2015, 35(2):137-144.

GE.com [online], "Predix Platform," available on or before Nov. 16, 2018 via Internet Archive: Wayback Machine URL<https://web.archive.org/web/20181116005032/https://www.ge.com/digital/iiot-platform>, retrieved on Jul. 9, 2021, retrieved from URL<https://www.ge.com/digital/iiot-platform>, 6 pages.

Genovese, "Data mesh: the newest paradigm shift for a distributed architecture in the data world and its application," Thesis for the degree of Computer Engineering, Politecnico di Torino, 2021, 76 pages.

Gergeleit et al., "Modeling Security Requirements and Controls for an Automated Deployment of Industrial IT Systems," Kommunikation und Bildverarbeitung in der Automation. Technologien für die intelligente Automation (Technologies for Intelligent Automation), Jan. 14, 2020, 12:217-231.

GitHub.com [online], "ALFA-group/BRON," available on or before Nov. 23, 2021 via Internet Archive: Wayback Machine URL<https://web.archive.org/web/20211123023700/https://github.com/ALFA-group/BRON>, retrieved on Oct. 4, 2022, retrieved from URL<https://github.com/ALFA-group/BRON>, 5 pages.

Giunchiglia et al., "Lightweight Ontologies," Technical Report DIT-07-071, University of Trento, Oct. 2007, 10 pages.

Gomez-Perez et al., "Ontology languages for the Semantic Web," IEEE Intelligent Systems, Feb. 2002, 17(1):54-60.

Grieves, "Virtually Intelligent Product Systems: Digital and Physical Twins", Complex Systems Engineering: Theory and Practice, Jul. 2019, 256:175-200.

Grigorescu et al., "CVE2ATT&CK: BERT-Based Mapping of CVEs to MITRE ATT&CK Techniques," Algorithms, Aug. 31, 2022, 15(9):314, 22 pages.

Guarino, "Formal Ontology in Information Systems," Presented at Proceedings of the 1st International Conference, Trento, Italy, Jun. 6-8, 1998, 3-15.

Guizzardi et al., "An Ontology-Based Approach for Evaluating the Domain Appropriateness and Comprehensibility Appropriateness of Modeling Languages," Models, 2005, 691-705.

Guizzardi, "On Ontology, ontologies, Conceptualizations, Modeling Languages, and (Meta)Models," Presented at Proceedings of the 2007 conference on Databases and Information Systems IV: Selected Papers from the Seventh International Baltic Conference, Amsterdam, Netherlands, Jun. 5, 2007, 18 pages.

Guizzardi, "Ontological Foundations for Structural Conceptual Models," Thesis for the degree of Doctor, University of Twente, 2005, 441 pages.

Guizzardi, "Ontology, Ontologies and the "I" of FAIR," Data Intelligence, Jan. 1, 2020, 2(1-2):181-191.

Guizzardi, "The role of foundational ontology for conceptual modeling and domain ontology representation," Presented at Proceedings of the 7th International Baltic Conference on Databases and Information Systems, Vilnius, Lithuania, Jul. 3-6, 2006, 9 pages.

Hadar et al., "Big Data Analytics on Cyber Attack Graphs for Prioritizing Agile Security Requirements", Proceedings of the 2019 IEEE 27th International Requirements Engineering Conference, Sep. 23-27, 2019, Jeju Island, Kora, 330-339.

Hadar et al., "Cyber Digital Twin Simulator for Automatic Gathering and Prioritization of Security Controls Requirements," Proceedings of the 2020 IEEE 28th International Requirements Engineering Conference, Aug. 31-Sep. 4, 2020, Zurich, Switzerland, 250-259.

Hansen et al., "Model-in-the-Loop and Software-in-the-Loop Testing of Closed-Loop Automotive Software with Arttest," Informatik, 2017, 13 pages.

Hasan et al., "Towards Optimal Cyber Defense Remediation in Energy Delivery Systems", Proceedings of 2019 IEEE Global Communications Conference, Dec. 9-13, 2019, Waikoloa, Hawaii, 7 pages.

Hassani et al., "Artificial Intelligence (AI) or Intelligence Augmentation (IA): What Is the Future?," AI, Apr. 12, 2020, 1(2):143-155.

Hemberg et al., "BRON—Linking Attack Tactics, Techniques, and Patterns with Defensive Weaknesses, Vulnerabilities and Affected Platform Configurations," arXiv, Oct. 1, 2020, arXiv:2010.00533v1, 14 pages.

Hemberg et al., "Using a Collated Cybersecurity Dataset for Machine Learning and Artificial Intelligence," arXiv, Aug. 5, 2021, arXiv:2108.02618v1, 5 pages.

Herre, "General Formal Ontology (GFO): A Foundational Ontology for Conceptual Modelling," Theory and Applications of Ontology: Computer Applications, Aug. 12, 2010, 297-345.

Hofner et al., "Dijkstra, Floyd and Warshall meet Kleene," Formal Aspects of Computing, Jul. 2012, 24(4-6):459-476.

Horrocks et al., "SWRL: A Semantic Web Rule Language Combining OWL and RuleML," W3C Member Submission, May 21, 2004, 24 pages.

Husák et al., "Survey of Attack Projection, Prediction, and Forecasting in Cyber Security," IEEE Communications Surveys & Tutorials, Sep. 24, 2018, 21(1):640-660.

Idika et al., "Extending attack graph-based security metrics and aggregating their application," IEEE Transactions on Dependable and Secure Computing, Jan./Feb. 2012, 9(1):75-85.

IEEE, "IEEE Standard for extensible Event Stream (XES) for Achieving Interoperability in Event Logs and Event Stream," IEEE Std 1849™-2016, Sep. 22, 2016, 50 pages.

IEEE.org [online], "This Car Runs on Code," Feb. 1, 2009, retrieved on Jul. 9, 2021, retrieved from URL<https://spectrum.ieee.org/transportation/systems/this-car-runs-on-code>, 5 pages.

Ingols et al., "Practical Attack Graph Generation for Network Defense," 2006 22nd Annual Computer Security Applications Conference (ACSAC'06), Miami Beach, Florida, Dec. 11-15, 2006, 10 pages.

International Organization for Standardization, "International Standard: ISO/IEC 27001," ISO/IEC 27001:2013(E), Oct. 1, 2013, 29 pages.

Jacobsen et al., "FAIR Principles: Interpretations and Implementation Considerations," Data Intelligence, Jan. 1, 2020, 2(1-2):10-29.

Joint Task Force Transformation Initiative, "Security and Privacy Controls for Federal Information Systems and Organizations," National Institute of Standards and Technology Special Publication 800-53, Revision 4, Jan. 22, 2015, 462 pages.

Kaloroumakis et al., "Toward a Knowledge Graph of Cybersecurity Countermeasures," Technical Report, the MITRE Corporation, 2021, 11 pages.

Khouzani et al., "Scalable min-max multi-objective cyber-security optimization over probabilistic attack graphs", European Journal of Operational Research, Nov. 1, 2019, 278(3):894-903.

Li et al., "Cluster security research involving the modeling of network exploitations using exploitation graphs," Proceedings of the IEEE International Symposium on Cluster Computing and the Grid, Singapore, May 16-19, 2006, 11 pages.

Lippmann et al., "Validating and restoring defense in depth using attack graphs," Proceedings of the Military Communications Conference, Washington, DC, USA, Oct. 23-25, 2006, 10 pages.

Lu et al., "Ranking attack graphs with graph neural networks," Proceedings of the 5th International Conference on Information Security Practice and Experience, Xi'an, China, Apr. 13-15, 2009; Lecture Notes in Computer Science, Apr. 2009, 5451:345-359.

Machado et al., "Data Mesh: Concepts and Principles of a Paradigm Shift in Data Architectures," Procedia Computer Science, 2022, 196:263-271.

(56) References Cited

OTHER PUBLICATIONS

Machado et al., "Data-Driven Information Systems: The Data Mesh Paradigm Shift," Presented at Proceedings of the 29th International Conference on Information Systems Development, Valencia, Spain, Sep. 8-10, 2021, 6 pages.

Makridakis, "The forthcoming artificial intelligence (ai) revolution: Its impact on society and firms," Futures, Jun. 2017, 90:46-60.

Manning Free Content Center [online], "Building Your Vocabulary," dated May 19, 2017, retrieved on Jun. 3, 2020, retrieved from URL <https://freecontent.manning.com/building-your-vocabulary/>, 10 pages.

Martins et al., "A framework for conceptual characterization of ontologies and its application in the cybersecurity domain," Software and Systems Modeling, Jul. 2, 2022, 21:1437-1464.

Martins et al., "Conceptual Characterization of Cybersecurity Ontologies," The Practice of Enterprise Modelling, Nov. 18, 2020, 323-338.

MaschinenMarkt.international [online], "Digital twin in the automobile industry," Aug. 1, 2019, retrieved on Jul. 9, 2021, retrieved from URL<https://www.maschinenmarkt.international/digital-twin-in-the-automobile-industry-a-851549/>, 3 pages.

Mashable.com [online], "Ford ready to innovate, but not at the expense of customer needs," May 31, 2016, retrieved on Jul. 9, 2021, retrieved from URL<https://mashable.com/article/mark-fields-ford-codecon>, 7 pages.

Mathis, "Data lakes," Datenbank-Spektrum, Oct. 6, 2017, 17(3):289-293.

Mehta et al., "Ranking attack graphs," Proceedings of the International Conference on Recent Advances in Intrusion Detection, Hamburg, Germany, Sep. 20-22, 2006; Lecture Notes in Computer Science, Sep. 2006, 4219:127-144.

Mitre.org [online], "CAPEC: Common Attack Pattern Enumerations and Classifications," available on or before Jul. 21, 2007 via Internet Archive: Wayback Machine URL<https://web.archive.org/web/20070721234158/https://capec.mitre.org/>, retrieved on Oct. 4, 2022, retrieved from URL<https://capec.mitre.org/>, 2 pages.

Mitre.org [online], "CWE: Common Weakness Enumeration," available on or before Oct. 9, 2006 via Internet Archive: Wayback Machine URL<https://web.archive.org/web/20061009060144/https://cwe.mitre.org/>, retrieved on Oct. 4, 2022, retrieved from URL<https://cwe.mitre.org/>, 1 page.

MITRE.org [online], "D3FEND," available on or before Jun. 22, 2021 via Internet Archive: Wayback Machine URL<https://web.archive.org/web/20210622142005/https://d3fend.mitre.org/>, retrieved on Jul. 13, 2022, retrieved from URL<https://d3fend.mitre.org/>, 3 pages.

MITRE.org [online], "Digital Artifact Ontology," available on or before Jun. 25, 2021 via Internet Archive: Wayback Machine URL<https://web.archive.org/web/20210625024718/https://d3fend.mitre.org/dao>, retrieved on Jul. 13, 2022, retrieved from URL<https://d3fend.mitre.org/dao/>, 3 pages.

MITRE.org [online], "Service Application," available on or before Jun. 25, 2021 via Internet Archive: Wayback Machine URL<https://web.archive.org/web/20210625024952/https://d3fend.mitre.org/dao/artifact/d3f:ServiceApplication/>, retrieved on Jul. 13, 2022, retrieved from URL<https://d3fend.mitre.org/dao/artifact/d3f:ServiceApplication/>, 1 page.

Monino, "Data Value, Big Data Analytics, and Decision-Making," Journal of the Knowledge Economy, Aug. 20, 2016, 256-267.

Murata, "Petri Nets: Properties, Analysis and Applications," Proceedings of the IEEE, Apr. 1989, 77(4):541-580.

Narmeen Zakaria Bawany; DDOS Attack Detection and Mitigation Using SON: Methods, Practices, and Solutions; Springer-2017; p. 425-441.

National Institute of Standards and Technology [online], "National Vulnerability Database," last updated Jun. 2, 2020, retrieved on Jun. 3, 2020, retrieved from URL<https://nvd.nist.gov/>, 4 pages.

Neo4j.com [online], "Random Walk," available on or before Aug. 6, 2020 via Internet Archive: Wayback Machine URL<https://web.archive.org/web/20200806193136/https://neo4j.com/docs/graph-data-science/current/alpha-algorithms/random-walk/>, retrieved on Jul. 28, 2021, retrieved from URL<https://neo4j.com/docs/graph-data-science/current/alpha-algorithms/random-walk/>, 7 pages.

Neo4j.com [online], "Topological link prediction," available on or before May 17, 2020, via Internet Archive: Wayback Machine URL<https://web.archive.org/web/20200517111258/https://neo4j.com/docs/graph-data-science/current/algorithms/linkprediction/>, retrieved on Jun. 14, 2022, retrieved from URL<https://neo4j.com/docs/graph-data-science/current/algorithms/linkprediction/>, 2 pages.

Neo4j.com [online], "Yen's K-Shortest Paths," available on or before Aug. 6, 2020 via Internet Archive: Wayback Machine URL<https://web.archive.org/web/20200806185626/https://neo4j.com/docs/graph-data-science/current/alpha-algorithms/yen-s-k-shortest-path/>, retrieved on Jul. 28, 2021, retrieved from URL<https://web.archive.org/web/20200806185626/https://neo4j.com/docs/graph-data-science/current/alpha-algorithms/yen-s-k-shortest-path/>, 5 pages.

Networks: An Introduction, Newman (ed.), May 2010, 789 pages.

Noel et al., "CyGraph: Graph-Based Analytics and Visualization for Cybersecurity," Handbook of Statistics, Jan. 2016, 35:117-167.

Ortalo et al., "Experimenting with quantitative evaluation tools for monitoring operational security," IEEE Transactions on Software Engineering, Sep./Oct. 1999, 25(5):633-650.

Ou et al., "A Scalable Approach to Attack Graph Generation," Proceedings of the 13th ACM Conference on Computer and Communication Security, Oct. 2006, 336-345.

Ou et al., "MulVAL: A Logic-based Network Security Analyzer," 14th USENIX Security Symposium, Aug. 2005, Baltimore, MD, USA, 16 pages.

Phillips et al., "A graph-based system for network-vulnerability analysis," Proceedings of the 1998 Workshop on New Security Paradigms, Charlottesville, Virginia, Sep. 22-26, 1998, 71-79.

PM4Py.de [online], "DFG: Process Discovery using Directly-Follows Graphs," available on or before Mar. 7, 2019 via Internet Archive: Wayback Machine URL<https://web.archive.org/web/20190307062454/http://pm4py.pads.rwth-aachen.de/documentation/process-discovery/dfg/>, retrieved on Jul. 28, 2021, retrieved from URL<https://web.archive.org/web/20190307062454/http://pm4py.pads.rwth-aachen.de/documentation/process-discovery/dfg/>, 4 pages.

PM4Py.de [online], "Process Discovery," available on or before Jun. 26, 2020 via Internet Archive: Wayback Machine URL<https://web.archive.org/web/20200626094921/https://pm4py.fit.fraunhofer.de/documentation#discovery>, retrieved on Jul. 28, 2021, retrieved from URL<https://pm4py.fit.fraunhofer.de/documentation#discovery>, 5 pages.

Process Mining, 1st ed., van der Aalst, 2011, Chapters 5-6, 63 pages.

Purvine et al., "A Graph-Based Impact Metric for Mitigating Lateral Movement Cyber Attacks", Automated Descision Making for Active Cyber Defence, Oct. 2016, pp. 45-52.

Q. Liu et al., "Latte: Large-Scale Lateral Movement Detection," MILCOM 2018—2018 IEEE Military Communications Conference (MILCOM), 2018, pp. 1-6, doi: 10.1109/MILCOM.2018.8599748. (Year: 2018).

Rossi et al., "Knowledge Graph Embedding for Link Prediction: A Comparative Analysis," arXiv, Feb. 3, 2020, arXiv:2002.00819v1, 42 pages.

Sales et al., "Ontological anti-patterns in taxonomic structures," Presented at Proceedings of ONTOBRAS 2019: XII Seminar on Ontology Research in Brazil, Porto Alegre, Brazil, Sep. 2-5, 2019, 13 pages.

Schatz et al., "Economic valuation for information security investment: a systematic literature review," Information Systems Frontiers, Apr. 18, 2016, 19:1205-1228.

Shandilya et al., "Use of Attack Graphs in Security Systems", Hindawi Journal of Computer Networks and Communications, Oct. 20, 2014, 2014:818957, 14 pages.

Shi et al., "Normalized Cuts and Image Segmentation," IEEE Transactions on Pattern Analysis and Machine Intelligence, Aug. 2000, 22(8):888-905.

Siemens.com [online], "From vehicle design to multi-physical simulations," available on or before Jul. 26, 2019 via Internet Archive: Wayback Machine URL<https://web.archive.org/web/20190726044643/https://new.siemens.com/global/en/markets/automotive-manufacturing/digital-twin-product.html>, retrieved on

(56) References Cited

OTHER PUBLICATIONS

Jul. 9, 2021, retrieved from URL<https://new.siemens.com/global/en/markets/automotive-manufacturing/digital-twin-product.html>, 11 pages.
Sitton-Candanedo et al., "A review of edge computing reference architectures and a new global edge proposal," Future Generation Computer Systems, Oct. 2019, 99:278-294.
SMMT.co.uk [online], "Role of Digital Twin in Automotive Industry," Dec. 17, 2018, retrieved on Jul. 9, 2021, retrieved from URL<https://www.smmt.co.uk/2018/12/role-of-digital-twin-in-automotive-industry/>, 9 pages.
Sourceforge.net [online], "XSB," last updated Oct. 29, 2017, retrieved on Jun. 3, 2020, retrieved from URL <http://xsb.sourceforge.net/>, 2 pages.
Stanek et al., "Method of comparing graph differencing algorithms for software differencing," 2008 IEEE International Conference on Electro/Information Technology, Ames, Iowa, May 18-20, 2008, 482-487.
Strom et al., "MITRE ATT&CK™: Design and Philosophy", The MITRE Corporation, Jul. 2018, 37 pages.
Swiler et al., "A graph-based network-vulnerability analysis system," Sandia National Laboratories, 1997, Tech. Rep. SAND97-3010/1, 25 pages.
Tan et al., "Future internet: The Internet of Things," Presented at Proceedings of the 2010 3rd International Conference on Advanced Computer Theory and Engineering (ICACTE), Chengdu, China, Aug. 20-22, 2010,.
TechCrunch.com [online], "Tesla is rolling out its Navigate on Autopilot feature," Oct. 27, 2018, retrieved on Jul. 9, 2021, retrieved from URL<https://techcrunch.com/2018/10/26/tesla-is-rolling-out-its-navigate-on-autopilot-feature/>, 17 pages.
The Fourth Industrial Revolution, 1st. ed., Schwab, Jan. 2017, 218 pages.
The MITRE Corporation [online], "MITRE ATT&CK," last updated May 27, 2020, retrieved on Jun. 3, 2020, retrieved from URL <https://attack.mitre.org/>, 3 pages.
Ullah et al., "Towards Modeling Attacker's Opportunity for Improving Cyber Resilience in Energy Delivery Systems", Resilience Week, Aug. 2018, pp. 100-107.
Uschold et al., "Ontologies: Principles, methods and applications," The Knowledge Engineering Review, Jan. 1996, 11(2):93-136.
Van Der Aalst et al., "Causal Nets: A Modeling Language Tailored towards Process Discovery," Presented at Proceedings of Concur 2011—Concurrency Theory, Aachen, Germany, Sep. 6-9, 2011; Lecture Notes in Computer Science, Sep. 2011, 6901:28-42.
Van Heijst et al., "Using explicit ontologies in KBS development," International Journal of Human-Computer Studies, Feb. 1997, 46(2-3):183-292.
Vehicle Power Management, 1st ed., Zhang et al (eds.), Aug. 2011, Chapter 10, 27 pages.
W3.org [online], "SWRL: A Semantic Web Rule Language Combining OWL and RuleML," May 21, 2004, retrieved on Oct. 4, 2022, retrieved from URL<https://www.w3.org/Submission/SWRL/>, 24 pages.
Wand et al., "On the deep structure of information systems," Information Systems Journal, Jul. 1995, 5(3):203-223.
Wang et al., "A Network Vulnerability Assessment Method Based on Attack Graph," 2018 IEEE 4th International Conference on Computer and Communications, Dec. 7-10, 2018, Chengdu, China, 1149-1154.
Wang et al., "Big data analytics in cyber security: network traffic and attacks," Journal of Computer Information Systems, Jan. 2020, 61(3):1-8.
Wang et al., "Exploring Attack Graph for Cost-benefit Security Hardening: A Probabilistic Approach," Computers & Security, Feb. 2013, 32:158-169.
Ward et al., "Threat Analysis and Risk Assessment in Automotive Cyber Security," SAE Int. J. Passeng. Cars Electron. Electr. Systems, May 2013, 6(2):507-513.

Wikipedia.org [online], "5G," last updated Jul. 9, 2021, retrieved on Jul. 9, 2021, retrieved from URL<https://en.wikipedia.org/wiki/5G>, 29 pages.
Wikipedia.org [online], "Active Directory," last updated Jun. 1, 2020, retrieved on Jun. 3, 2020, retrieved from URL <https://en.wikipedia.org/wiki/Active_Directory>, 14 pages.
Wikipedia.org [online], "Backward Chaining," last updated Nov. 16, 2019, retrieved on Jun. 3, 2020, retrieved from URL <https://en.wikipedia.org/wiki/Backward_chaining>, 3 pages.
Wikipedia.org [online], "Breadth-first search," last updated Jul. 21, 2021, retrieved on Jul. 28, 2021, retrieved from URL<https://en.wikipedia.org/wiki/Breadth-first_search>, 6 pages.
Wikipedia.org [online], "Cartesian Product," last updated Feb. 28, 2020, retrieved on Jun. 3, 2020, retrieved from URL <https://en.wikipedia.org/wiki/Cartesian_product>, 9 pages.
Wikipedia.org [online], "Centrality," last updated May 29, 2020, retrieved on Jun. 3, 2020, retrieved from URL <https://en.wikipedia.org/wiki/Centrality>, 15 pages.
Wikipedia.org [online], "Centrality," last updated Oct. 18, 2020, retrieved on Oct. 26, 2020, retrieved from URL<https://en.wikipedia.org/wiki/Centrality>, 15 pages.
Wikipedia.org [online], "Common Vulnerabilities and Exposures," last updated Jul. 6, 2021, retrieved on Jul. 9, 2021, retrieved from URL<https://en.wikipedia.org/wiki/Common_Vulnerabilities_and_Exposures>, 5 pages.
Wikipedia.org [online], "Common Vulnerability Scoring System," last updated Jun. 21, 2021, retrieved on Jul. 9, 2021, retrieved from URL<https://en.wikipedia.org/wiki/Common_Vulnerability_Scoring_System>, 7 pages.
Wikipedia.org [online], "Depth-first search," last updated Jun. 16, 2021, retrieved on Jul. 28, 2021, retrieved from URL<https://en.wikipedia.org/wiki/Depth-first_search>, 8 pages.
Wikipedia.org [online], "Digital twin," last updated Jul. 8, 2021, retrieved on Jul. 9, 2021, retrieved from URL<https://en.wikipedia.org/wiki/Digital_twin>, 13 pages.
Wikipedia.org [online], "Eigenvector centrality," last updated Dec. 1, 2020 retrieved on Jan. 11, 2021, retrieved from URL<https://en.wikipedia.org/wiki/Eigenvector_centrality>, 4 pages.
Wikipedia.org [online], "Flood Fill," last updated Dec. 24, 2019, retrieved on Jun. 3, 2020, retrieved from URL <https://en.wikipedia.org/wiki/Flood_fill>, 7 pages.
Wikipedia.org [online], "Floyd-Warshall algorithm," last updated Jan. 5, 2021, retrieved on Jan. 11, 2021, retrieved from URL<https://en.wikipedia.org/wiki/Floyd%E2%80%93Warshall_algorithm>, 7 pages.
Wikipedia.org [online], "Forward Chaining," last updated Nov. 18, 2019, retrieved on Jun. 3, 2020, retrieved from URL <https://en.wikipedia.org/wiki/Forward_chaining>, 3 pages.
Wikipedia.org [online], "Look-ahead (backtracking)," last updated May 23, 2020, retrieved on Jun. 3, 2020, retrieved from URL <https://en.wikipedia.org/wiki/Look-ahead (backtracking)>, 3 pages.
Wikipedia.org [online], "Natural language processing," last updated Jun. 10, 2022, retrieved on Jun. 14, 2022, retrieved from URL<https://en.wikipedia.org/wiki/Natural_language_processing>, 13 pages.
Wikipedia.org [online], "Reachability," last updated Oct. 22, 2021, retrieved on Jul. 13, 2022, retrieved from URL<https://en.wikipedia.org/wiki/Reachability>, 5 pages.
Wikipedia.org [online], "SCADA," last updated Jun. 2, 2020, retrieved on Jun. 3, 2020, retrieved from URL <https://en.wikipedia.org/wiki/SCADA>, 12 pages.
Wikipedia.org [online], "Sigmoid function," last updated Dec. 25, 2020, retrieved on Jan. 11, 2021, retrieved from URL<https://en.wikipedia.org/wiki/Sigmoid_function>, 4 pages.
Wikipedia.org [online], "SWOT analysis," last updated Oct. 20, 2020, retrieved on Oct. 26, 2020, retrieved from URL<https://en.wikipedia.org/wiki/SWOT_analysis>, 8 pages.
Wikipedia.org [online], "Traffic congestion," last updated Oct. 5, 2020, retrieved on Oct. 26, 2020, retrieved from URL<https://en.wikipedia.org/wiki/Traffic_congestion>, 24 pages.
Wikipedia.org [online], "Traffic flow," last updated Oct. 19, 2020, retrieved on Oct. 26, 2020, retrieved from URL<https://en.wikipedia.org/wiki/Traffic_flow>, 41 pages.

(56) References Cited

OTHER PUBLICATIONS

Wikipedia.org [online], "Zero-day (computing)," last updated Oct. 16, 2020, retrieved on Oct. 26, 2020, retrieved from URL<https://en.wikipedia.org/wiki/Zero-day_(computing)>, 8 pages.

Wu et al., "A service-oriented architecture for business intelligence," Presented at Proceedings of the IEEE International Conference on Service-Oriented Computing and Applications (SOCA '07), Newport Beach, CA, USA, Jun. 19-20, 2007, 279-285.

X. Li, C. Zhang, T. Jung, J. Qian and L. Chen, "Graph-based privacy-preserving data publication," IEEE Infocom 2016—The 35th Annual IEEE International Conference on Computer Communications, 2016, pp. 1-9, doi: 10.1109/IN F000M.2016.7524584. (Year: 2016).

Xie et al., "Using Bayesian Networks for Cyber Security Analysis," Proceedings of the 2010 IEEE/IFIP International Conference on Dependable Systems & Networks, Jun. 28-Jul. 1, 2010, Chicago, Illinois, 211-220.

Yi et al., "Overview on attack graph generation and visualization technology," 2013 International Conference on Anti-Counterfeiting, Security and Identification (ASID), Shanghai, China, Oct. 25-27, 2013, 6 pages.

You et al., "A Review of Cyber Security Controls from an ICS Perspective," Proceedings of 2018 International Conference on Platform Technology and Service (PlatCon), Jan. 29-31, 2018, Jeju, South Korea, 5 pages.

Zeng et al., "Survey of Attack Graph Analysis Methods from the Perspective of Data and Knowledge Processing," Hindawi Security and Communication Networks, Dec. 26, 2019, 2019:2031063, 17 pages.

Zhang et al., "Co-simulation framework for design of time-triggered cyber physical systems," 2013 ACM/IEEE International Conference on Cyber-Physical Systems (ICCPS), Philadelphia, Pennsylvania, Apr. 8-11, 2013, 119-128.

Zhang et al., "Optimal Decision-Making Approach for Cyber Security Defense Using Game Theory and Intelligent Learning," Security and Communication Networks, Dec. 23, 2019, 2019:3038586, 17 pages.

Zhao et al., "Attack graph analysis method for large scale network security hardening," J. Front. Comput. Sci. Technology, 2018, 12(2):263-273 (with English Abstract).

Chen Zhong, Towards Agile Cyber Analysis: Leveraging Visualization as Functions in Collaborative Visual Analytics, IEEE:2017, pp. 1-2.

EP Extended Search Report in European Appln. No. 22187514.9, dated Nov. 29, 2022, 7 pages.

EP Extended Search Report in European Appln. No. 22193272.6, dated Jan. 25, 2023, 8 pages.

\* cited by examiner

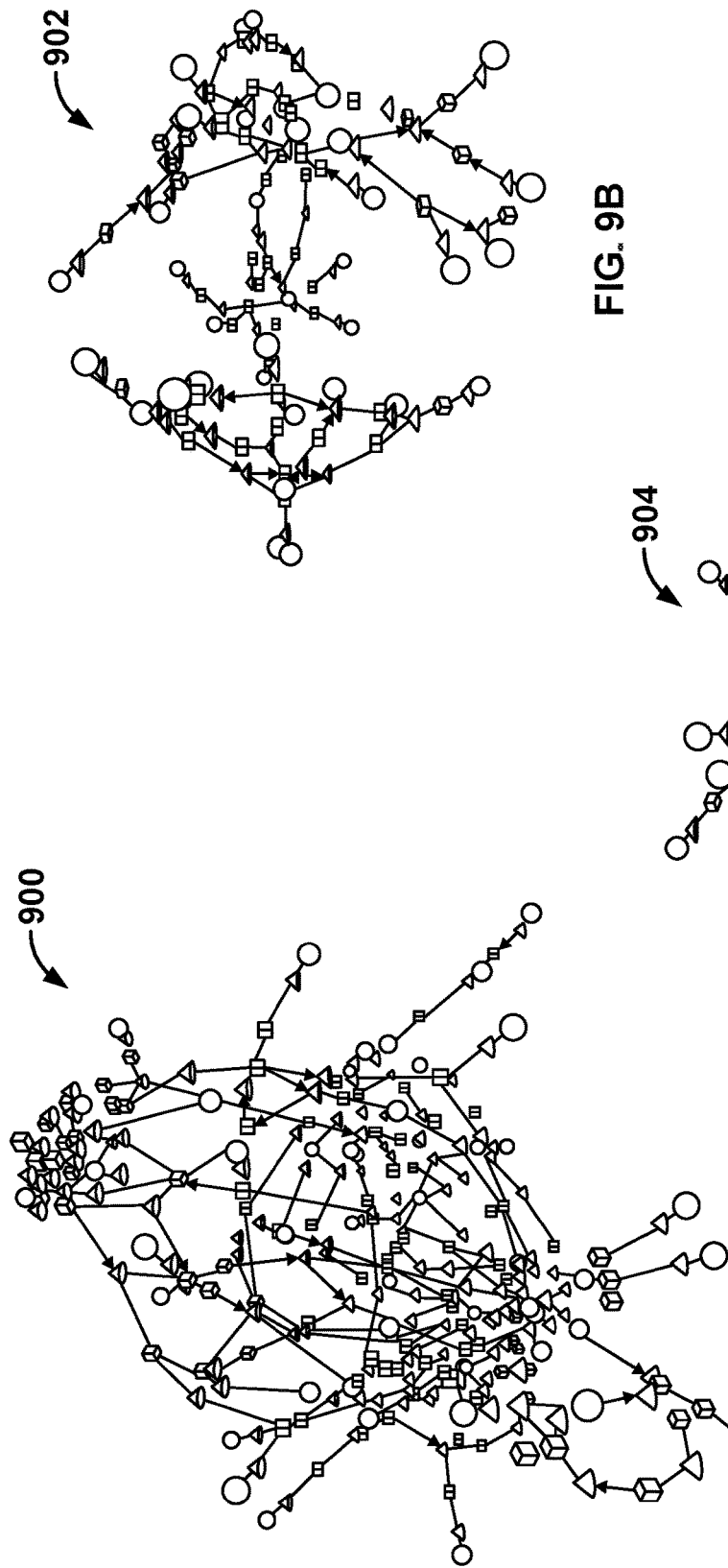
FIG. 9B
FIG. 9A
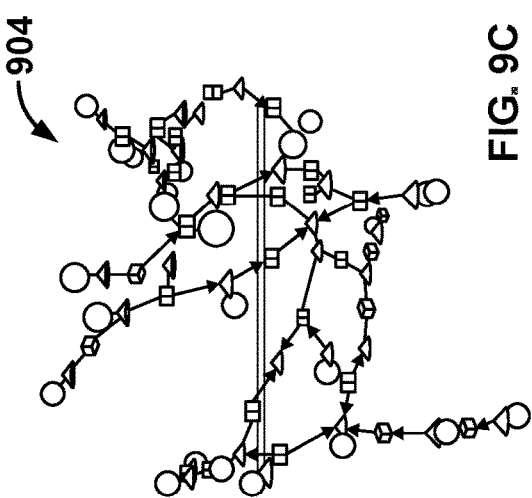
FIG. 9C

PRIORITIZING SECURITY CONTROLS USING A CYBER DIGITAL TWIN SIMULATOR

CROSS-REFERENCE TO RELATED APPLICATIONS

This application claims priority to U.S. 63/232,399, filed on Aug. 12, 2021, the disclosure of which is expressly incorporated herein by reference in the entirety.

BACKGROUND

Computer networks are susceptible to attack by malicious users (e.g., hackers). For example, hackers can infiltrate computer networks in an effort to obtain sensitive information (e.g., user credentials, payment information, address information, social security numbers) and/or to take over control of one or more systems. Computer networks are used to execute processes that support operations of enterprises and/or industrial infrastructures. Enterprises, in general, and industrial infrastructures, in particular, are increasingly connected to external networks such as the Internet. As such, processes that were once isolated from the open Internet network, are now vulnerable to external cyber-attacks. As the frequency and derived impact of these attacks increase, there is a need to prioritize and mitigate risks in order of importance to the operations.

To defend against such attacks, enterprises use security systems to monitor occurrences of potentially adverse events occurring within a network, and alert security personnel to such occurrences. For example, one or more dashboards can be provided, which provide lists of alerts that are to be addressed by the security personnel. However, the scale and complexity of cyber threats in digital enterprises hamper operator ability to gather, prioritize, and rationalize which security controls requirements should be handled first for achieving rapid risk reduction.

SUMMARY

Implementations of the present disclosure are directed to mitigating cyber security risk in enterprise networks. More particularly, implementations of the present disclosure are directed to systems and methods to automatically prioritize cyber-security countermeasures using intelligent digital twins. A Cyber Digital Twin (CDT) platform executes simulations on a digital twin of an enterprise network to determine and prioritize security controls requirements to mitigate cyber security risk in the enterprise network.

The expected result of the disclosed techniques is the ability to automatically recommend a set of relevant countermeasures, given prioritized issues that were discovered over an analytical attack graph (AAG). Given an attack tactic, the system searches over a public knowledge graph (KG) for countermeasures. The AAG can be integrated with, for example, a KG of a Detection, Denial, and Disruption Framework Empowering Network Defense (D3FEND) framework. The disclosed techniques include using advanced analytics over the AAG to search for relevant countermeasures in the KG. By using publicly and continually maintained security representations, the system can ensure that the most up-to-date recommendations are made.

In some implementations, actions include receiving an analytical attack graph (AAG) representing paths within the enterprise network with respect to at least one target asset, the AAG at least partially defining a digital twin of the enterprise network and comprising a set of rule nodes, each rule node representing an attack tactic of a plurality of attack tactics that can be used to move along a path of the AAG; integrating the AAG with a knowledge graph (KG) comprising a set of asset nodes, each asset node representing a digital asset that can be affected by one or more of the plurality of attack tactics; determining, based on integrating the AAG with the KG, a plurality of security controls, each security control of the plurality of security controls having an assigned priority value; and selectively implementing the security controls in the enterprise network based at least partially on the assigned priority values of the security controls.

Other implementations of this aspect include corresponding systems, apparatus, and computer programs, configured to perform the actions of the methods, encoded on computer storage devices.

These and other implementations can optionally include one or more of the following features: the AAG comprises a set of impact nodes, each impact node representing an impact of an attack tactic on a digital asset; integrating the AAG with the KG comprises mapping each impact node of the set of impact nodes to an asset node of the set of asset nodes of the KG; the AAG comprises a set of fact nodes, each fact node indicating a condition of the enterprise network; integrating the AAG with the KG comprises mapping each fact node of the set of fact nodes to an asset node of the set of asset nodes of the KG; the KG comprises a set of tactic nodes, each tactic node representing a tactic for attacking digital assets of the enterprise network; the KG comprises a set of countermeasure nodes, each countermeasure node representing a security control for mitigating risk to digital assets of the enterprise network; integrating the AAG with the KG comprises mapping each rule node of the set of rule nodes to a tactic node of the KG; the KG comprises a public KG of a D3FEND framework; a digital asset comprises a configuration item of the enterprise network; integrating the AAG with the KG comprises: accessing a mapping file indicating connections between AAG nodes and KG nodes, and determining connections between nodes of the AAG and nodes of the KG based on the mapping file; determining the plurality of security controls, each security control of the plurality of security controls having an assigned priority value comprises: prioritizing the rules nodes of the set of rule nodes of the AAG, determining, based on integrating the AAG with the KG, a connection between each rule node of the AAG and a respective countermeasure node of a set of countermeasure nodes of the KG, and prioritizing the countermeasure nodes of the set of countermeasure nodes of the KG based on the connections between the rule nodes of the AAG and the countermeasure nodes of the KG; selectively implementing the security controls in the enterprise network comprises: providing a set of remediation actions based on the assigned priority values of the plurality of security controls, and executing at least one remediation action in the set of remediation actions to mitigate risk to the enterprise network.

The present disclosure also provides a non-transitory computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a non-transitory computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF THE DRAWINGS

FIGS. 9A-9C depicts an evolution of an example AAG over multiple iterations in accordance with implementations of the present disclosure.

Like reference numbers and designations in the various drawings indicate like elements.

DETAILED DESCRIPTION

Implementations of the present disclosure are directed to mitigating cyber security risk in enterprise networks. More particularly, implementations of the present disclosure are directed to systems and methods to automatically prioritize cyber-security security controls using intelligent digital twins. A Cyber Digital Twin (CDT) platform executes simulations on a digital twin of an enterprise network to determine and prioritize security controls requirements to mitigate cyber security risk in the enterprise network.

The proposed techniques integrate a knowledge graph (e.g., D3FEND) into the cyber digital twin in order to identifying and prioritize to most effective counter measures to be employed in order to reduce system's risk. An open source knowledge graph holds information related to digital artifacts and their related attack tactics and security controls.

As described in further detail herein, implementations of the present disclosure provide a CDT platform that executes simulations using a digital twin of an enterprise network based on attack graph analytics. In some implementations, the cyber digital twin, also referred to herein as digital twin, is used to automatically gather and prioritize security requirements at scale over a respective (active) enterprise network. The digital twin represents information about the computer network, and is used to associate the information with attack tactics, measure the efficiency of implemented security controls requirements, and automatically detect missing security controls. The digital twin is used to evaluate cyber risk, measured as a risk value, over the attack graphs and proposes prioritization of detected requirements towards rapid reduction of risk under active system constraints. In some implementations, a CDT simulator offers several risk reduction methods for automatically selecting security controls requirements. Data used for constructing a contextual digital twin is defined including relations between security controls and attack tactics. Calculations used for ranking security controls risk impact, the algorithm for security controls requirements prioritization, and a demonstration of successful results using a field experiment conducted on an active enterprise network are each described in further detail herein.

Figure 1:
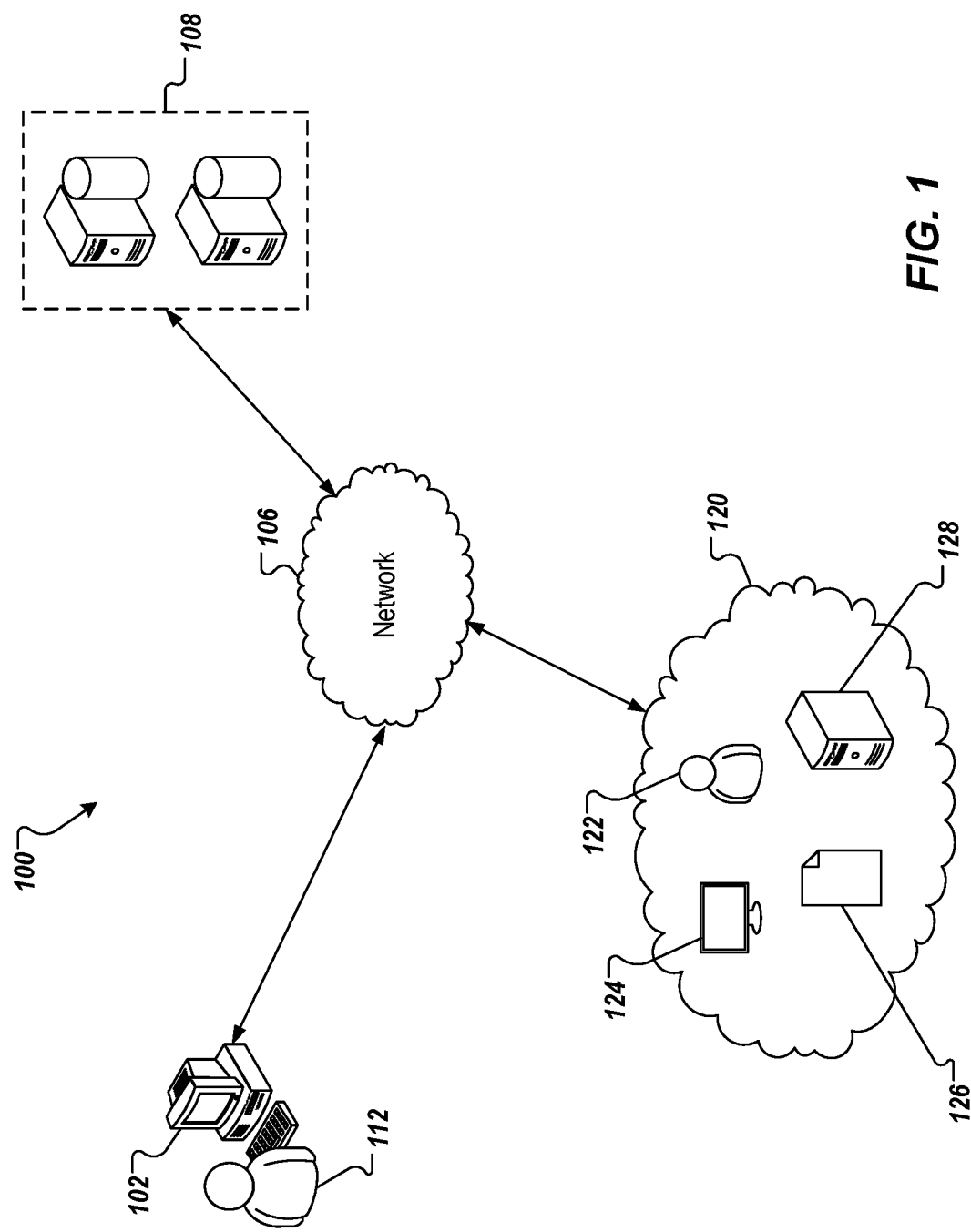
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 108. The server system 108 includes one or more server devices and databases (e.g., processors, memory). In the depicted example, a user 112 interacts with the client device 102.

In some examples, the client device 102 can communicate with the server system 108 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provides such services to any number of client devices (e.g., the client device 102 over the network 106). In accordance with implementations of the present disclosure, and as noted above, the server system 108 can host a CDT platform.

In the example of FIG. 1, an enterprise network 120 is depicted. The enterprise network 120 represents a network implemented by an enterprise to perform its operations. In some examples, the enterprise network 120 represents on-premise systems (e.g., local and/or distributed), cloud-based systems, and/or combinations thereof. In some examples, the enterprise network 120 includes IT systems and OT systems. In general, IT systems include hardware (e.g., computing devices, servers, computers, mobile devices) and software used to store, retrieve, transmit, and/or manipulate data within the enterprise network 120. In general, OT systems include hardware and software used to monitor and detect or cause changes in processes within the enterprise network 120 as well as store, retrieve, transmit, and/or manipulate data. In some examples, the enterprise network 120 includes multiple assets. Example assets include, without limitation, users 122, computing devices 124, electronic documents 126, and servers 128.

In some implementations, the CDT platform is hosted within the server system 108, and monitors and acts on the enterprise network 120, as described herein. More particularly, and as described in further detail herein, the CDT platform executes simulations on a digital twin of an enterprise network (e.g., the enterprise network 120) to determine and prioritize security controls requirements to mitigate cyber security risk in the enterprise network. In some examples, the CDT platform is provided as part of a security platform, such as an agile security platform discussed herein. In some examples, the CDT platform is separate from and interacts with a security platform, such as the agile security platform discussed herein. As described in further detail herein, one or more security controls can be implemented in the enterprise network 120 based on security controls requirements identified through simulation in order to reduce risk of cyber-attack in the enterprise network 120.

To provide further context for implementations of the present disclosure, in the area of cyber security resiliency (e.g., how resilient an enterprise network is to cyber-attack), enterprise practitioners may rely on the implementation of procedures, processes, and automation tools, which can be collectively referred to as Security Controls (SCs). In general, a SC (also referred to as a remediation action) can be associated with a fact and/or a rule, as a known remediation action for mitigating the fact and/or rule (e.g., preventing the fact from occurring by preventing execution of a rule). An example SC can include, without limitation, installing a security patch to resolve a vulnerability of a particular version of software. Executing efficient SCs is aimed at preventing and handling security issues and problems prior to the materialization of the consequent cyber risk. Such security issues are introduced to the enterprise cyber space in an overwhelming rate, driving the need for constant optimization and prioritization of requirements that are more critical to the business first, followed by automatic implementation to remediate the imminent cyber risks. In addition, being able to trace the enterprise cyber posture to employed automation and practices of SC requirements (SCRs) is not a direct indication of success in preventing attacks by hackers. As such, goals of employing SCs are to reduce the attack surface over time as suggested by compliance drives, and focus less on prevention of coordinated attacks and imminent risk reduction toward targeted crown jewels.

Investment in SCs materializes in tools and processes aimed at solving optimized and automated known security needs, while other investments in SCs are projected and planned according to new types of threats, or adjustments to new and more efficient security tools. The existing implementation of SCs may be evaluated by constantly tracing and correlating security requirements with the active attack surface of the network, such as discovering and analyzing pathways to specific targets. As the attack surface mutates due to new threat intelligence introduced and changes in the infrastructure settings and configuration, implemented security tools can become invalid, while new tools may be inadequate.

One option to evaluate the efficiency of implemented security tools or detecting a gap that highlights missing SCs is by understanding how hackers may move within the network. Exploitation of vulnerabilities in the network is done by performing lateral movements between acquired IT assets. Such actions are possible due to missing implementation of some SCs that could have prevented these actions in the first place. As such, the pure existence of modeled attack pathways is an indication of lack of performance or missing implementation of SCRs. Compliance needs and standards are key drivers for defining security requirements that are manifested in SCs. Such needs are adjusted to the type of the organization domain, the type of network, connected systems, etc. As discussed herein, such definitions of requirements do not consider potential movements of hackers in the network, exploiting existing vulnerabilities within the context of targeted attack pathways. The context of the network hackability state is missing from the considerations and definitions of the requirements.

A connection between the ability to hack an active system and automatically discover SCRs in a context of potential cyber-attacks is described herein. A method and technology for constructing a contextual cyber digital twin that maps the relations between SCs and attack tactics that, in turn, represent SCRs are also described in detail herein. Also described are definitions of SCs and types of attack graphs, and a framework and method for using a cyber digital twin that captures attack pathways as a means for discovering SCRs. The methodology details how to measure an impact of an attack and the relation to relevant SCs as well as ways for prioritization of SCRs to reduce the risk impact as quick as possible. A simulator is provided for performing the SCRs analysis, including incremental and iterative manner for rapid decay of risk. In some examples, SCs refer to a set of SCs (e.g., one or more SCs), each SC being a tool (e.g., software) and/or action that can be executed in the enterprise network to mitigate risk. In some examples, SCRs refer to a set of SCRs (e.g., one or more SCRs), each SCR representing an absence of a SC in the enterprise network that should be addressed by implementing a SC to mitigate risk.

In some examples, SCs may be defined as a combination of policies, methods, and tools that are aimed at protecting an enterprise network from cyber-attack. In some examples, SCs are classified into fourteen groups according to ISO/IEC 27001 standards, while the U.S. government's National Institute of Standards and Technology (NIST) provides seventeen groups of SCs. To illustrate the implications of SCs in the present disclosure, some of the classifications listed in Table 1 are used.

TABLE 1

Example SC Groups by Industry Standarization Authorities.

| ISO/IEC 27001 | NIST, 800-53, Revision 4 |
| --- | --- |
| A.5: Information security policies | AC: Access Control |
| A.6: How information security is organized | AT: Awareness and Training |
| | AU: Audit and Accountability |
| A.7: Human resources security | CA: Security Assessment and Authorization |
| A.8: Asset management | |
| A.9: Access controls and managing user access | CM: Configuration Management |
| | CP: Contingency Planning |
| A.10: Cryptographic technology | IA: Identification and Authentication |
| A.11: Physical security and equipment | IR: Incident Response |
| A.12: Operational security | MA: Maintenance |
| A.13: Secure communications and data transfer | MP: Media Protection |
| | PE: Physical and Environmental Protection |
| A.14: Secure acquisition, development, and support of information systems | PL: Planning |
| A.15: Security for suppliers and third parties | PS: Personnel Security |
| | RA: Risk Assessment |
| A.16: Incident management | SA: System and Services Acquisition |
| A.17: Business continuity and disaster recovery | SC: System and Communications Protection |
| A.18: Security Compliance | SI: System and Information Integrity |

Each SC group depicted within Table 1 contains specific policies. Examples are the ISO/IEC 27001 A.8 asset management group, that contains policy #8.1.1 for asset inventory and policy #8.1.3 for assets acceptable usage, for example. Described in further detail herein is a mechanism and technology for detecting and tracking missing implementations of specific sub-set of security requirements that are part of the generic SCs, yet specifically relevant to the context of an enterprise network that is under analysis. Consequently, the technology supports the evaluation of SCs effectiveness and allocated capital relevant to the enterprise network under investigation and tuned to defined business targets.

SCRs can be gathered in various manners. In some implementations, a detailed analysis of assets of an enterprise network is performed and an implementation plan based on best practices is provided. In some implementations, SCRs can be generated from an examined system using industry standards. Some implementations for cyber security investment assessment rely on methods of game theory, multi-objective optimization, stochastic calculus, and other ideas. For example, the investment strategy may be modeled as a game between a defender and an attacker. The defender's goal may be to assemble a defense toolkit that would minimize potential attack damage given a limited budget constraint. The task may be reduced to an optimization problem and solved by algorithms such as the Knapsack problem. The underlying data used is the output of a network scanner as well as information about vulnerabilities published at a public catalog such as the National Vulnerability Database (NVD) provided by the U.S. government. However, despite the validity and efficiency of this mathematical apparatus, the approach may not address how the vulnerabilities are exploited in practice during a real-life, targeted attack. If an attack is undertaken against a specific target or a set of targets within a computer network, a different location of identical vulnerabilities in the network has a different impact. Possible attacker actions and different pathways to the targets that generate different impacts may be included in evaluation of security control effectiveness.

Attack pathways can be modeled as attack trees, petri nets, and lately mostly used, as attack graphs. Modeling approaches that capture nodes as physical assets (e.g., a workstation machine) and edges as potentials lateral movements of a hacker between two assets are referred to as Physical Attack Graphs (PAG). Modeling logical rules that define how an attacker advances within the network are represented in Analytical Attack Graphs (AAGs). These logical rules are in essence a representation of security requirements, as enablers to adversarial lateral movement, which a defender is required to eliminate and nullify. Use of AAGs in mitigating attacks on computer networks is described in further detail in commonly assigned U.S. application Ser. No. 16/554,846, entitled Generating Attack Graphs in Agile Security Platforms, and filed on Aug. 29, 2019, the disclosure of which is expressly incorporated herein by reference in the entirety for all purposes. Further, generation of AAGs is described in further detail in commonly assigned U.S. application Ser. No. 16/924,483, entitled Resource-efficient Generation of Analytical Attack Graphs, and filed on Jul. 9, 2020, the disclosure of which is expressly incorporated herein by reference in the entirety for all purposes.

In some implementations, cyber security investment analysis relies on attack graphs. In some implementations, the problem of SCRs is modeled as a multi-objective optimization problem with the goals of: (1) minimizing the cyber security risk on targets, (2) reducing direct costs of a security control deployment, and (3) reducing indirect costs of security control implementation. An example of indirect cost is employee's loss of time due to more sophisticated compliance procedures.

In some implementations, attack graphs may be generated based on network scanners output, known published vulnerabilities, and network related data sources (e.g., firewall rule analyzers) as a good approximation to some types of attacks. Probabilistic graphical models, such as Bayesian networks, can be used to reflect difficulty differences of exploiting vulnerability. However, modern attacks are more sophisticated. To model a hacker's movement adequately during a complex attack, not only endpoint vulnerabilities and network firewall rules should be considered, but also amongst other, user access permissions and open sessions status. In some implementations, a complete approach to address the complexity of a modern attack may be used. AAGs may be created based on a wide range of facts about the network assets and their interaction. The data can be received from multiple sources and can include features such as, for example, user account hierarchies, complete software installation compared to those detected by port scanner, clear access authorization credentials, and others. In some examples, rules may be provided from the MITRE ATT&CK™ knowledgebase of attack tactics.

In accordance with implementations of the present disclosure, the CDT platform generates detailed AAGs to multiple targets with multiple origins. A digital twin can be described as a software-implemented replica of a physical entity that captures aspects of the physical entity. In the instant case, the physical entity is an enterprise network and an aspect is a cyber security posture. A digital twin is unique, because it captures and models the aspect of the enterprise's cyber security posture from a hacker's perspective and models hacker's movements, instead of the pure system monitored state. In short, the digital twin can be described as an inferencing model of the enterprise network.

As described in further detail herein, the CDT platform of the present disclosure enables creation and use of digital twins for automatically gathering and prioritizing SCRs within large industrial settings, where scale and complexity hampers the ability of manual analysis. More particularly, the CDT platform includes a simulator that tracks lack of SCRs implementation within the context of targets that are exposed to cyber security risks. The analysis of the attack graph towards which set of SCRs should be implemented first, is aimed at rapidly reducing the attack surface size. As such, the simulation examines how the implementation of a set of SCs can affect the organization's overall cyber risk exposure. Described in further detail herein are details of the methodology and the data types the simulator uses, the attack graph in the form of AAG, a SCs Traceability Matrix (TM) and a set of configuration parameters. For illustrative purposes, the SCs are selected to be policies and rules extracted from the ISO/IEC 27001 standard. In some cases, a goal of an enterprise is to comply with these policies. In other cases, the goal may be to prioritize budget proposals or to assess effectiveness of previous year budget allocations for cyber security tools. In real world scenarios, the SCs could be mapped to projects that represent cyber security budget proposals.

An attack graph is based on associating rules and impacts according to facts (each of rules, impacts, and facts being represented as respective nodes) that are based on evidence collected from Configuration Items (CI). CIs are network assets such as computers, user accounts, and the like. Some of the CIs can be target CIs, commonly referred to as crown jewels, which are highly valuable machines, applications, or processes. Rules are attack tactics that are derived from the collected facts, forming associations and links in the graph. Rules can be provided from a data source, such as the rules provided from MITRE ATT&CK™. Facts can be information on the CI such as, for example, identification, configuration, installed software and its version, open sessions, memory map, vulnerability, user group membership, or a network share access permission, and the like. Rules represent needed SCRs to be implemented. SCRs can be, for example, to isolate an application in a sandbox, to disable a program, segment a network, to change user privileges, and the like. Consequently, a rule may be to implement one of the former requirements in order to prevent the ability to and attack tactic of executing a code on a remote machine, for example. Impacts are the outcomes of not implementing a rule inference (e.g., ability to elevate user privileges on a given machine under a specific account). The discovered information is fed into a proprietary rule engine that uses the discovered facts, applies the rules, and generates the impacts, in an aggregated manner across all CIs, towards all target CIs (crown jewels). The output of the process is the attack graph (e.g., AAG).

In order to evaluate the success of risk reduction and to decide which SCRs to prioritize, a Graph Risk Value (GRV) is defined, as in Eq. 1, as a measure of the cyber risk exposure of the enterprise network. GRV is a single-valued scalar metric that is related to an exponential cost model and can be provided as:

$$GRV = \Sigma_{i \in M} R_i \qquad (1)$$

where $R_i$ is a risk measure of an individual target impact and M is a set of target impacts. Risk can be determined as follows:

$$R_i = e^{-\frac{H_i}{\alpha}} \cdot C_i \qquad (2)$$

where $H_i$ is hardness of all paths to target i, $\alpha$ is damping constant (e.g., $\alpha=8$), and $C_i$ is a graph theory eigenvector centrality measure of target impact node in the modeled AAG. Hardness is a value defined by a cyber security expert for each rule indicating how difficult the rule is to perform based on, for example, available tools, script, previous experience and the like. In some examples, $H_i$ is calculated as an average over all rules on all paths that lead to a target. The rules that are used to generate the AAG may be defined by cyber security experts. For each rule, the experts may also define a set of SCs that can mitigate the effect of the rule.

To illustrate this principle, an example attack tactic is referenced. The example attack tactic includes T1175 (provided from MITRE ATT&CK™) that defines a lateral movement of a hacker from one machine to another, by utilizing MS Windows DCOM infrastructure. In order to use this tactic, an adversary must acquire a user account with certain privileges. Such an account should be a member of the Distributed COM group on a host machine. Consequently, the hacker can perform a remote procedure call (RPC) over the network to a target machine. In addition, the target machine must be listening on a predefined set of ports supported by DCOM infrastructure. To mitigate the exposure to this type of attack, MITRE offers several tactics that are mapped to SCs defined by ISO/IEC 27001 standard as depicted in Table 2.

TABLE 2

Example of Requirements for T11175.

| Proposed Mitigation for T1175 (MITRE ATT&K) | Required Security Controls (ISO/IEC 27001) |
| --- | --- |
| 1. Application Isolation and Sandboxing | A.9.1.1 Access Control |
| 2. Disable or Remove Feature or Program | A.9.1.2 Access to Networks and Network Services |
| 3. Network Segmentation | A.13.1.3 Segregation in Networks |
| 4. Privileged Account Management | |

Namely, MITRE T1175 requirements is to implement three mitigations, in which a security expert may need to implement several SCs. In the case of T1175, the security expert may opt to implement an Access Control Policy (A911), an Access to Networks and Network Services policy (A912), and a Segregation in Networks policy (A1313). By implementing even one of these three SCRs, a defender can eliminate the potential lateral movement. Accordingly, the conditional logic is an AND relation between the policies.

This Boolean condition can be defined as a Prolog rule used to generate the attack graph in the form of:

Listing 1: Example Rule in Prolog.

```
execCode(Host, User) :–
    userInLocalGroup(Host, 'DISTRIBUTED COM USERS>', User),
    canNetComm(SrcHost, Host),
    execCode(SrcHost, User),
    @ports Host:or(135, U135, 1029)
```

Listing 1 is an example of a Boolean AND condition of MITRE T1175 rules (e.g., AND multiplication between existing user group, network access, and ability to remotely execute code, applied on an open port). This example Prolog syntax indicates that four conditions must be met for an adversary to be able to execute code on Host under privileges of the User account. First, userInLocalGroup indicates that a User must be a member of specified local group including indirect membership, or effective membership as a result of other attack tactics defined as rules. The second condition, canNetComm, requests a network communication between the source and destination hosts. Thirdly, the User must already be able to execute code, execCode, on the source host machine. Finally, the host must have a service listening on either one of TCP ports 135, 1029 or on UDP port 135, using the request @ports. It should be noted that the term @ports is an extension to standard Prolog syntax.

Another cardinal data set processed by the simulator is a mapping between SCs and lateral movement rules. This mapping is provided in the form of a sparse matrix that is referred to as a Traceability Matrix (TM). For example, TM=($tm_{ij}$), where $tm_{ij} \neq 0$, if security control i can be used to mitigate attack tactic j representing a rule node in AAG, otherwise $tm_{ij}=0$. Possible values for $tm_{ij}$ can include values in a set of 3 symbols: {0, *, +}.

If $tm_{ij} \neq 0$, then the relation between the SC and the attack tactic is defined by a Boolean logic operator. It may either be a logical AND (*) or a logical OR (+). A Boolean OR operator instructs implementing one SC to eliminate the risk of the attack tactic. In the example above, it is enough to either redefine user permissions or to isolate DCOM server by updating firewall rules. Each SC implementation will result in mitigation (e.g., elimination) of a particular attack-related risk. However, there could be a situation when only implementation of all SCs related to the attack tactic will lead to its elimination. In such a case, the relation is defined by a Boolean AND operator. Table 3 depicts an example TM with logical operators.

TABLE 2

SC Traceability Matrix with Logic Operators

| | SC1 | SC2 | SC3 | SC4 | SC5 | ... | SCn |
|---|---|---|---|---|---|---|---|
| LR1 | + | 0 | 0 | + | 0 | ... | + |
| LR2 | 0 | + | + | 0 | 0 | ... | 0 |
| LR3 | 0 | 0 | 0 | + | + | ... | 0 |
| LR4 | + | 0 | + | 0 | + | ... | + |
| ⋮ | ⋮ | ⋮ | ⋮ | ⋮ | ⋮ | ⋱ | ⋮ |
| LRm | 0 | 0 | + | 0 | + | ... | 0 |

In Table 3, $SC_1$, $SC_2$, ... $SC_N$ are security controls $LR_1$, $LR_2$, ..., $LR_M$ are Lateral movement rules that are mapped to SCRs, n is index of the evaluated SC. The TM values indicate the relations between the requirements and SCs, and the exposure to a rule. The "+" symbol means a Boolean OR relations, and the "*" symbol indicates a Boolean AND.

In some implementations, the TM is used to calculate impact influence scores on each SC as provided in Eq. 3:

$$SC_i = \Sigma_{j \in A} tm_{ij} \cdot rc_j \quad (3)$$

where $SC_i$ is influence score of security control i, $rc_j$ is a count of rules that correspond to tactic j in the AAG, where function $f(x)$ is defined in Eq. 4:

$$f(x) = \begin{cases} 1, & \text{if } x = * \text{ or } x = + \\ 0, & \text{otherwise} \end{cases} \quad (4)$$

The value of $SC_i$ represents how many times an attacker can use the tactic within the enterprise network toward the defined target. The set A contains all implemented rules (attack tactics).

Figure 2:
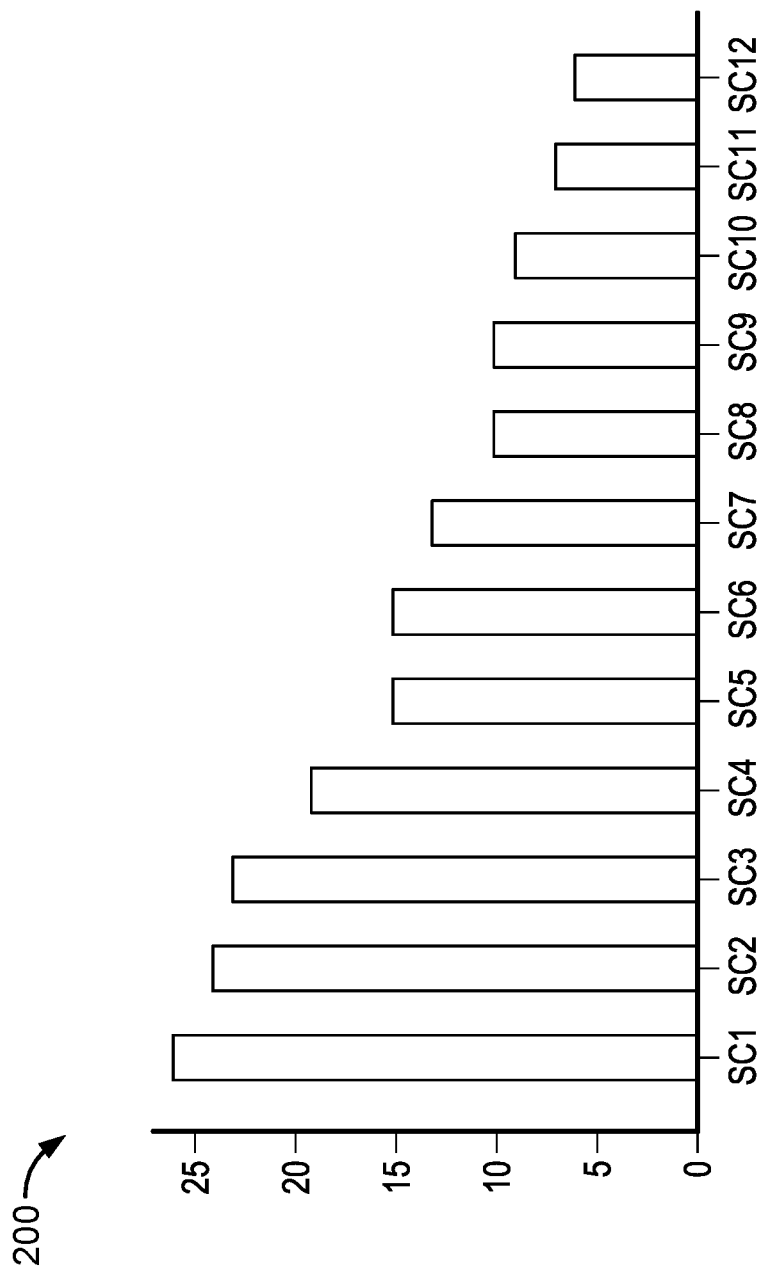
FIG. 2 is an example influence score histogram that illustrates contribution of security controls to an overall cyber risk exposure of an enterprise.

To visualize the contribution SCs make to mitigating the overall cyber risk exposure of an enterprise, an influence score histogram can be used. FIG. 2 depicts an example impact influence histogram 200. In the example of FIG. 2, the SCs are ordered by their influence score.

In some examples, different types of SCs are provided. Example types include immutable and mutable. Immutable SCs, also referred to as mandatory SCs, which cannot be eliminated due to restrictions that are not controlled by the security team, or that are not implemented at all, namely, a gap in the organization cyber resiliency. A list of immutable SCs, if there are any, is also defined as a configuration setting of the simulator.

Implementation of SCRs is costly and time consuming. The simulator conducts sensitivity analysis based on different risk reduction techniques aimed at proposing which SCs to handle first. This analysis is conducted in an iterative and incremental manner. Each technique simulates implementation of a set of SCs to consequently reduce the number of rule types in the corresponding AAG.

Figure 3:
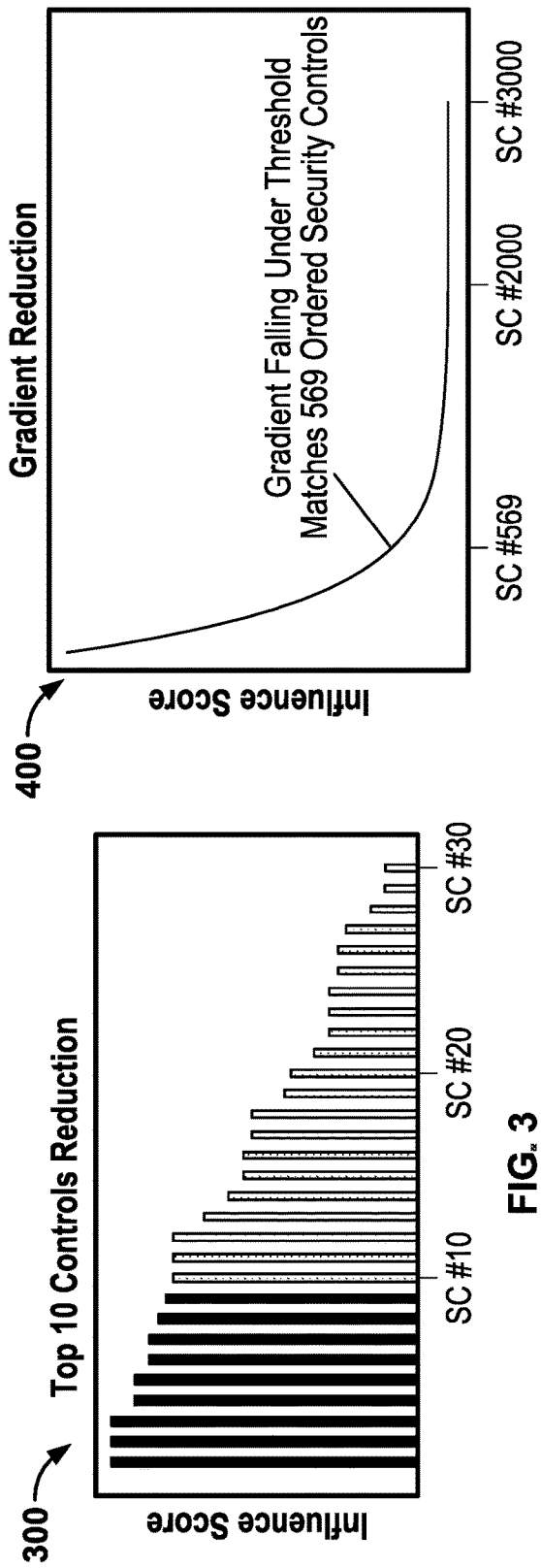
FIG. 3 is an example security controls histogram that illustrates risk reduction simulation using a security controls technique.
Figure 4:
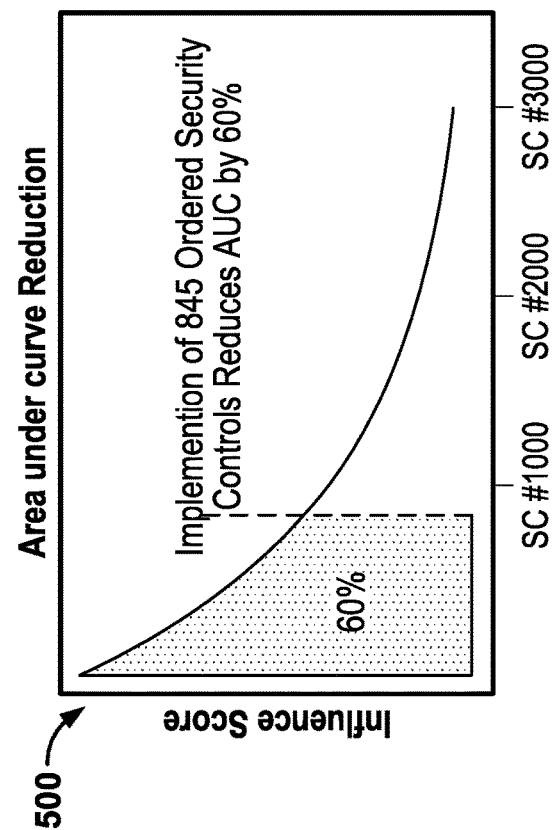
FIG. 4 is an example security controls curve that illustrates risk reduction simulation using a gradient reduction technique.
Figure 5:
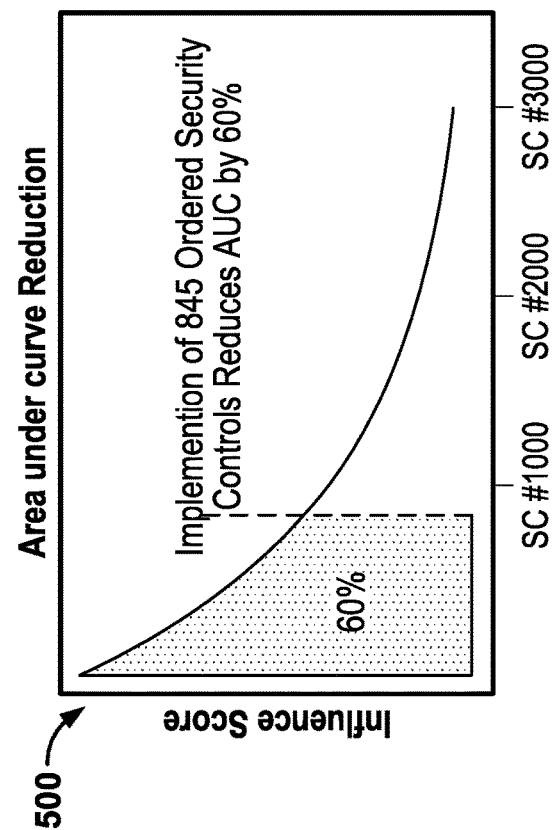
FIG. 5 is an example security controls curve that illustrates a risk reduction simulation using an area under the curve technique.

FIGS. 3, 4, and 5 illustrate a comparison of techniques. FIG. 3 depicts an influence score SC plotted as a histogram 300 for a small number of SCs. However, a large organization may have thousands of different SCs. FIG. 4 is a plot histogram 400 that depicts a curve that contains 3000 SCs. The histogram 400 is ordered as such that the top influencing SCs are on the left, as such an obvious strategy is to start by implementing SCs that have the highest SC influence score, and by selecting a certain quantity of those SCs. The gradient reduction technique referenced in FIG. 4 refers to an algorithm that continuously calculates the slope gradient between decaying SCs. The algorithm stops when the slope reaches a threshold value selected by the user of the simulator. This enables the user to select a point on the curve where the gradient, or the rate of change, slows down. This algorithm is useful for exponential drops. In practice this means some SCRs are disproportionate to the overall cyber security exposure of the enterprise network under investigation. An example can be to select SCs that are above 0.6 slope angle.

FIG. 4 depicts a graph illustrating the area under curve (AUC) technique. AUC is suitable for a curve with monotonic influence reduction. This is the case when there is no clear winner, and the contribution of different SCs to the overall cyber security risk is relatively uniform. The algorithm receives the percentage of AUC to reduce as a configuration parameter and enumerates the SCs which contribute to such a segment. An example can be to select the area that contains 10% of the overall number of rules in the existing AAG. The simulator provides the ability to feed a custom selection and de-selection of SCs for implementation due to business restrictions and constraints that are known to the users.

In some implementations, the CDT platform of the present disclosure can be executed as part of an agile security platform. In some examples, the agile security platform determines asset vulnerability of enterprise-wide assets including cyber-intelligence and discovery aspects of enterprise information technology (IT) systems and operational technology (OT) systems, asset value, potential for asset breach and criticality of attack paths towards target(s) including hacking analytics of enterprise IT/OT systems.

Figure 6:
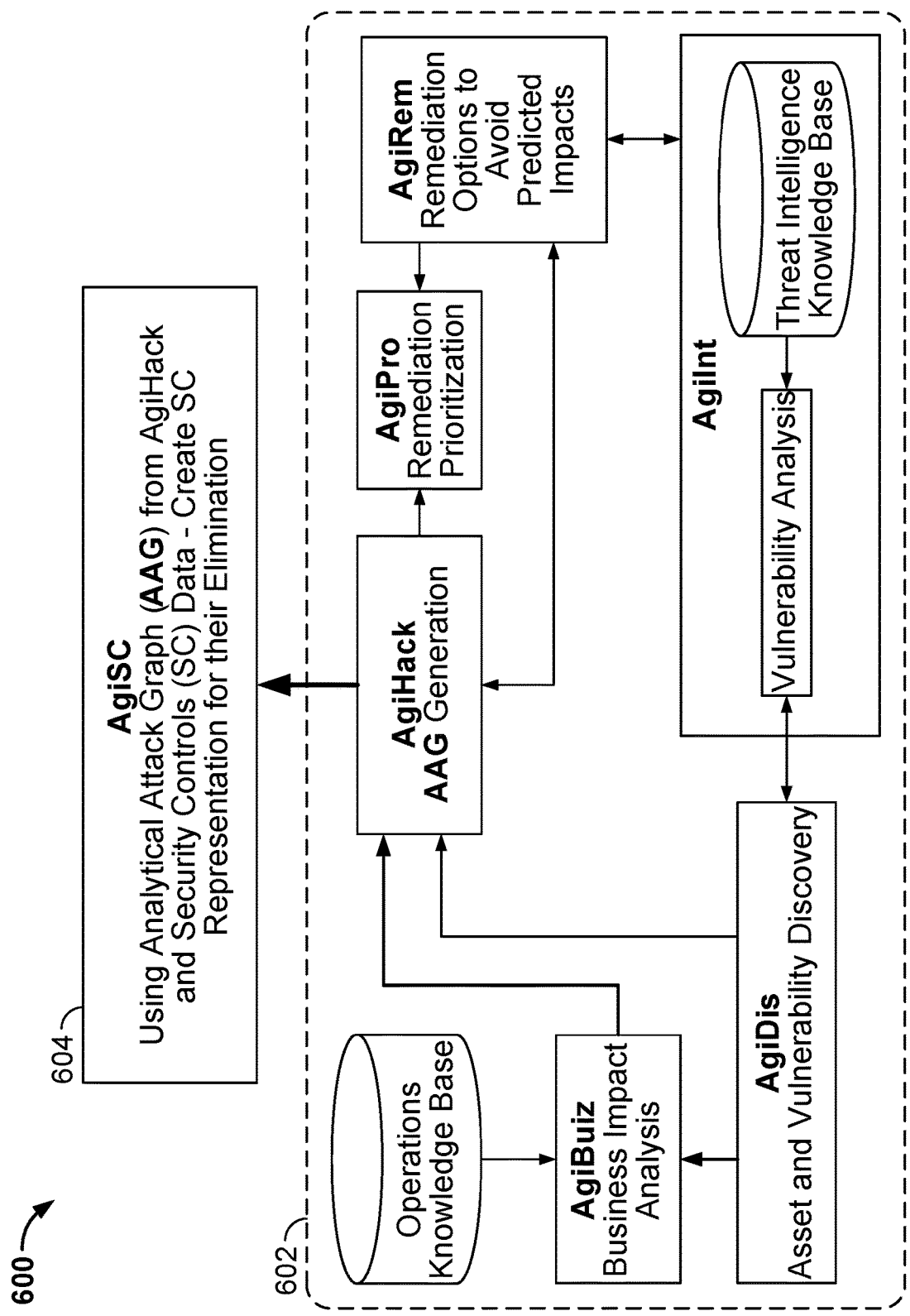
FIG. 6 depicts an example agile Security (AgiSec) system architecture with the addition of an Agile Security Controls (AgiSC) module.

FIG. 6 depicts an example conceptual architecture 600 of an agile security (AgiSec) platform. In the example of FIG. 6, an agile security system 602 and an agile SC (AgiSC) module 604 are depicted. In some examples, the agile SC module 604 executes the simulator of the CDT platform of the present disclosure.

In further detail, the agile SC module 604 processes data provided by an agile discovery (AgiDis) module and an agile security hacker lateral movement (AgiHack) module. In some examples, the AgiDis module discovers assets and vulnerabilities of the enterprise network using third-party tools. The extracted data is stored in a data lake for further analysis by other AgiSec modules. In some examples, the AgiHack module generates an AAG of the enterpriser network by extracting AgiDis data and employing attack rules created by cyber security experts. The AgiHack module explores attack paths an attacker can traverse to advance towards targets in order to identify possible impacts on these targets. The agile SC module 604 receives the AAG from the AgiHack module and maps attack tactics of the AAG to SCs. Further detail of the agile security system 602 and the respective modules is provided in each of U.S. application Ser. No. 16/554,846 and U.S. application Ser. No. 16/924,483 introduced above. While the agile SC module 604 is depicted as being separate from the agile security system 602 in FIG. 6, it is contemplated that the agile SC module 604 can be included as part of the agile security system 602.

Figure 7:
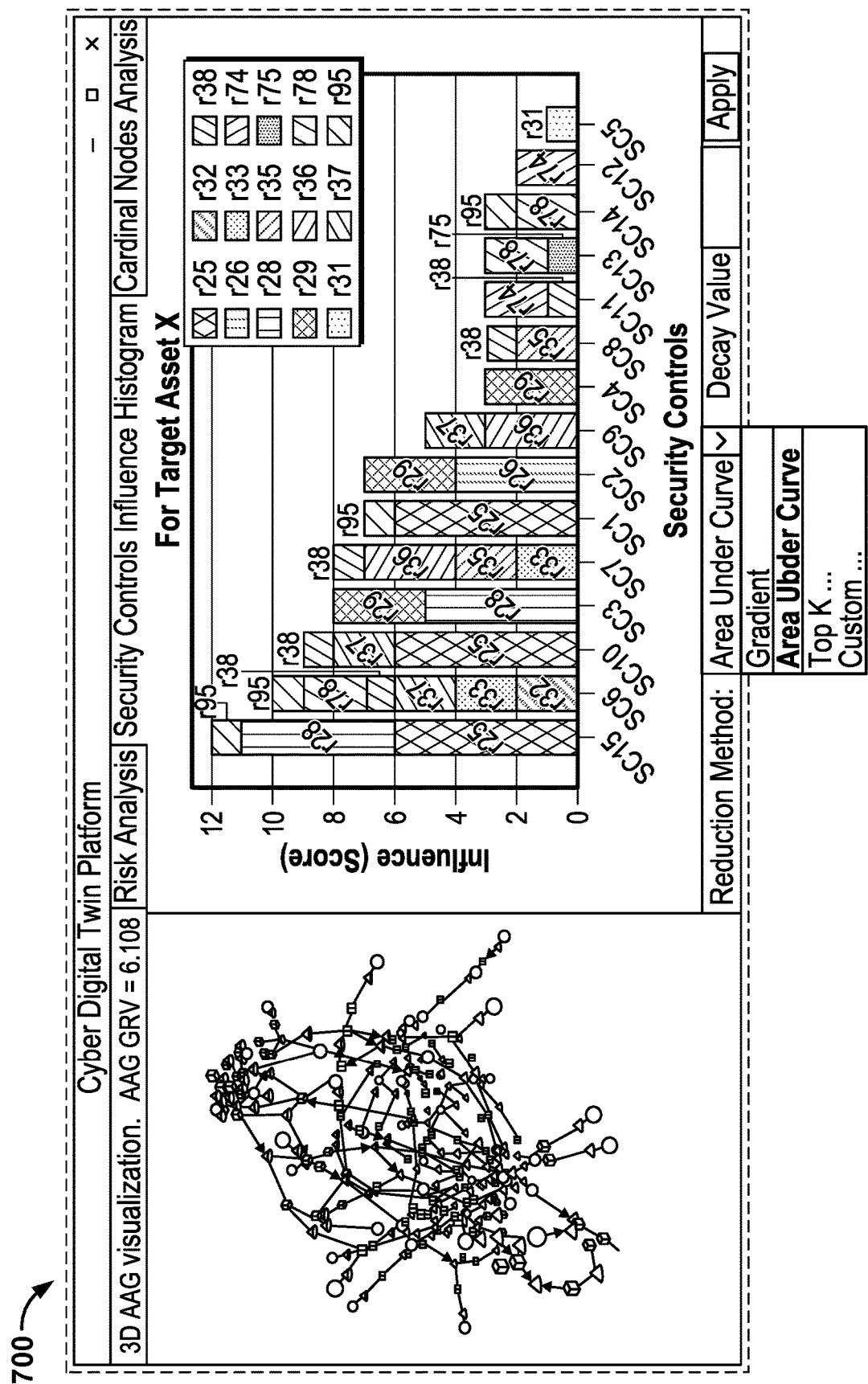
FIG. 7 depicts an example user interface in accordance with implementations of the present disclosure.

In some implementations, the agile SC module 604 includes a configuration defining the TM and a list of constraints over SCs, indicating which SC cannot be handled due to real-systems restrictions (e.g., mandatory SCs). In some examples, the agile SC module 604 provides output to a graphical user interface (GUI) for manual selection of a reduction technique and a decay configuration parameter per iteration. An example GUI 700 is depicted in FIG. 7.

For each iteration, for a given input AAG, the agile SC module 604 selects SCs that are to be prioritized first, according to a selected reduction algorithm and corresponding parameters. Subsequently, the agile SC module 604 eliminates all nodes in the AAG that represent rules and requirements that are associated with the selected SCs. Pruning of the nodes results in a reduced version of the AAG, which is referred to as a residual AAG. The removed rule nodes define the current iteration list of requirements to implement, in order of importance, according to the number of appearances of the rules in the most critical SC. The agile SC module 604 creates an influence histogram that reflects the residual rules that where not handled yet. If all rules related to a certain SC were handled previously, the SC is eliminated from the remaining backlog of requirements and will no longer be presented in subsequent histograms. As the simulation progresses, each former AAG becomes an input AAG for the next iteration, and different methods of reductions can be employed. Over the iterations, the residual AAGs become sparser until the attack surface is eliminated. Subsequently, the produced list of security requirements is appended to the former batch of requirements.

Figure 8:
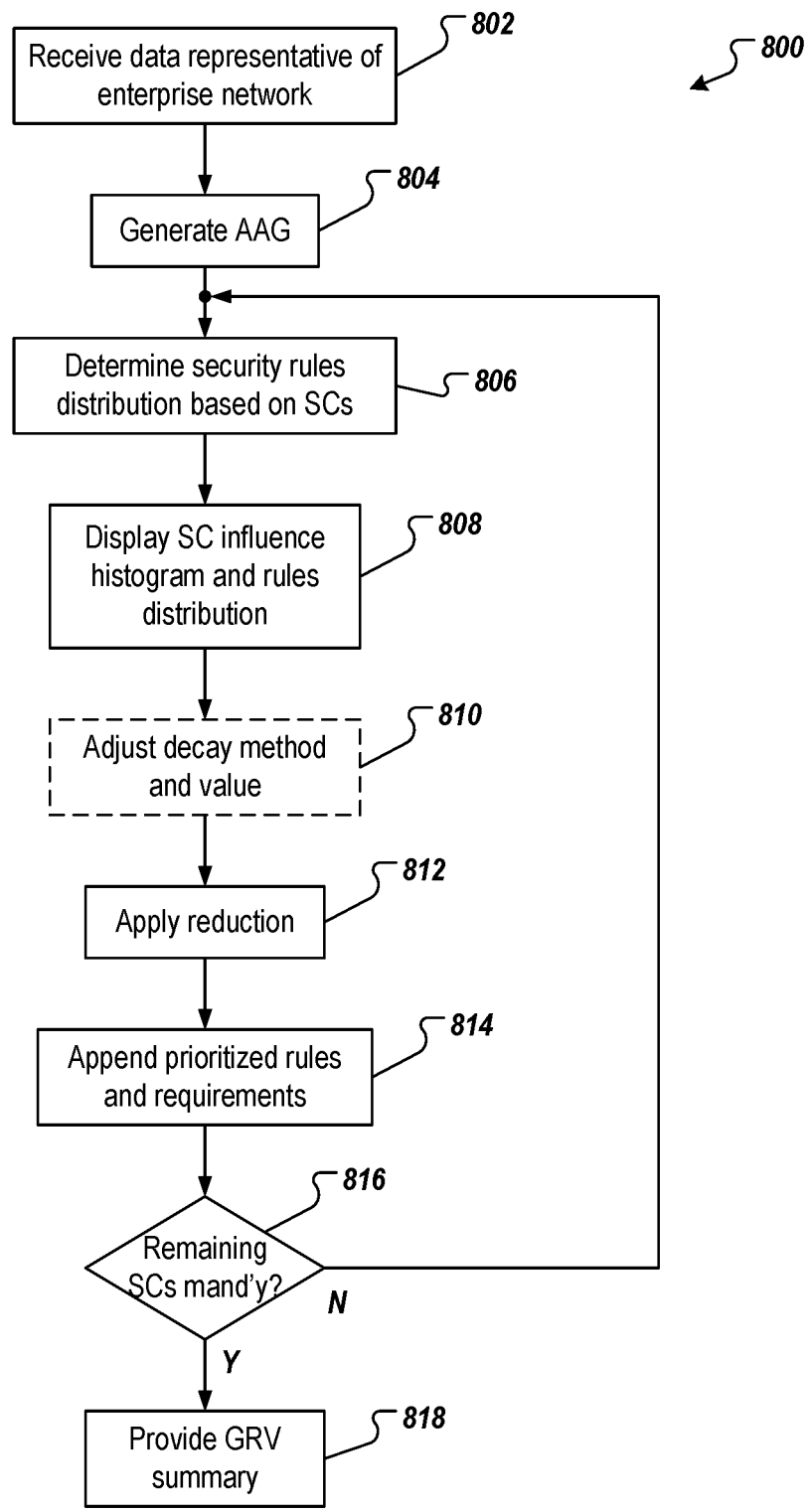
FIG. 8 is a flowchart of an example process that can be executed in accordance with implementations of the present disclosure.

FIG. 8 is a flowchart of an example process 800 that can be executed in accordance with implementations of the present disclosure. In some implementations, the example process 800 may be performed using one or more computer-executable programs executed using one or more computing devices. The example process 800 can be performed for cyber-attack risk evaluation and mitigation in accordance with implementations of the present disclosure.

Data representative of an enterprise network is received (802). For example, a discovery service (e.g., executed by the AgiDis module of FIG. 6) discovers assets and vulnerabilities of the enterprise network using third-party tools. In some examples, the discovery services scans an enterprise network to identify assets (e.g., CIs) within the enterprise network and, for each asset, information representative of a configuration of the asset (e.g., identification, configuration, installed software and its version, open sessions, memory map, user group membership, network share access permission). In some examples, vulnerabilities of one or more assets can be determined. For example, each asset can be cross-referenced with a data source (e.g., MITRE ATT&K™) to identify one or more attack tactics that a respective asset is vulnerable to. An AAG is generated (804). For example, an AAG generation service (e.g., executed by the AgiHack module of FIG. 6) processes the data representative of the enterprise network to generate an AAG with respect to one or more target assets (crown jewels), the AAG representing one or more paths to each target asset within the enterprise network. In some examples, the AAG is generated as described in U.S. application Ser. No. 16/924,483, introduced above.

A security rules distribution is determined (806). For example, each rule (attack tactic) depicted in the AAG is mapped to one or more SCs (i.e., an SC that mitigates the rule). In some examples, and as described herein, a traceability matrix (TM) is provided, which defines a mapping between SCs and attack tactics (rules). In some examples, a SC can mitigate one or more rules. Accordingly, a rules distribution for each SC can be provided, each rules distribution indicating one or more rules that a respective SC mitigates. A SC influence histogram and a rules distribution are displayed (808). For example, and as described in detail herein, for each SC, an influence score is calculated (e.g., as described herein with reference to Eq. 3), which represents a degree of influence the respective SC has on cyber risk in the enterprise network (e.g., if the SC were to be implemented, how much influence the SC would have in mitigating overall cyber risk). An influence histogram with rules distribution is provided, such as that depicted in FIG. 10A.

Optionally (as indicated in dashed line), a decay method and value are adjusted (810). In some examples, a decay method and value can be preset (e.g., default settings of a simulator). In some examples, the decay method and value can be automatically selected. For example, the influence histogram can be analyzed to determine a type of curve that is represented (e.g., exponential drop, monotonic reduction). In some examples, if the influence histogram is of a first type (e.g., exponential drop), then a first decay method (reduction) (e.g., gradient reduction) is selected. In some examples, if the influence histogram is of a second type (e.g., monotonic reduction), then a second decay method (reduction) (e.g., AUC) is selected. In some examples, the decay method and value are displayed by the simulator, and a user can adjust, if desired.

A reduction is applied (812). For example, and as described herein, the simulator applies the decay method to the AAG based on the value to reduce rules in the AAG, as represented in a resulting residual AAG. In some examples, the decay method is applied until the value is achieved. For example, the value represents a threshold that indicates ending of the decay method for an iteration of simulation (e.g., threshold slope angle, threshold AUC reduction). Prioritized rules and requirements are appended (814). For example, and as described herein, a residual AAG is provided and includes remaining rules as respective SCs. It is determined whether all remaining SCs are mandatory (816). If all remaining SCs are mandatory, a GRV summary is provided (818) and the simulation ends. If not all remaining SCs are mandatory, the example process 800 loops back to execute a next iteration of the simulation.

Figure 10A:
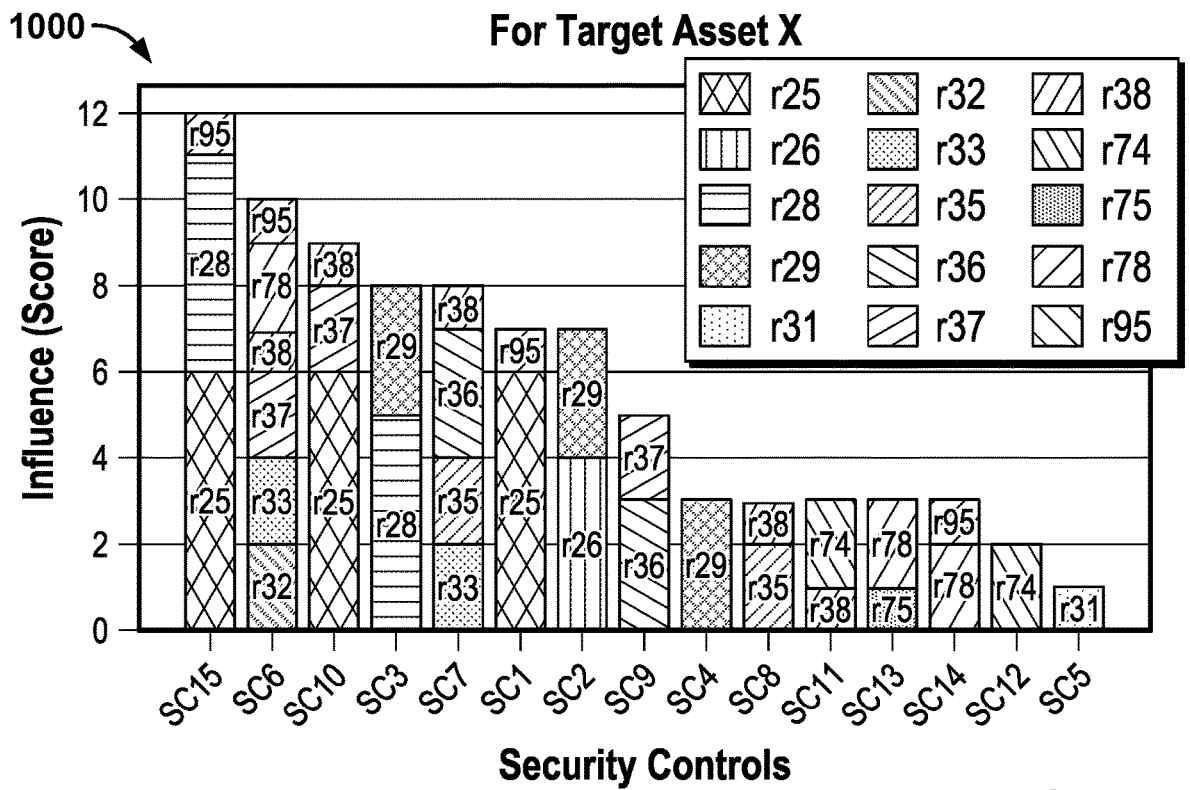
FIGS. 10A-10C depicts an evolution of an influence histogram corresponding to the example AAG of FIGS. 9A-9C.
Figure 10B:
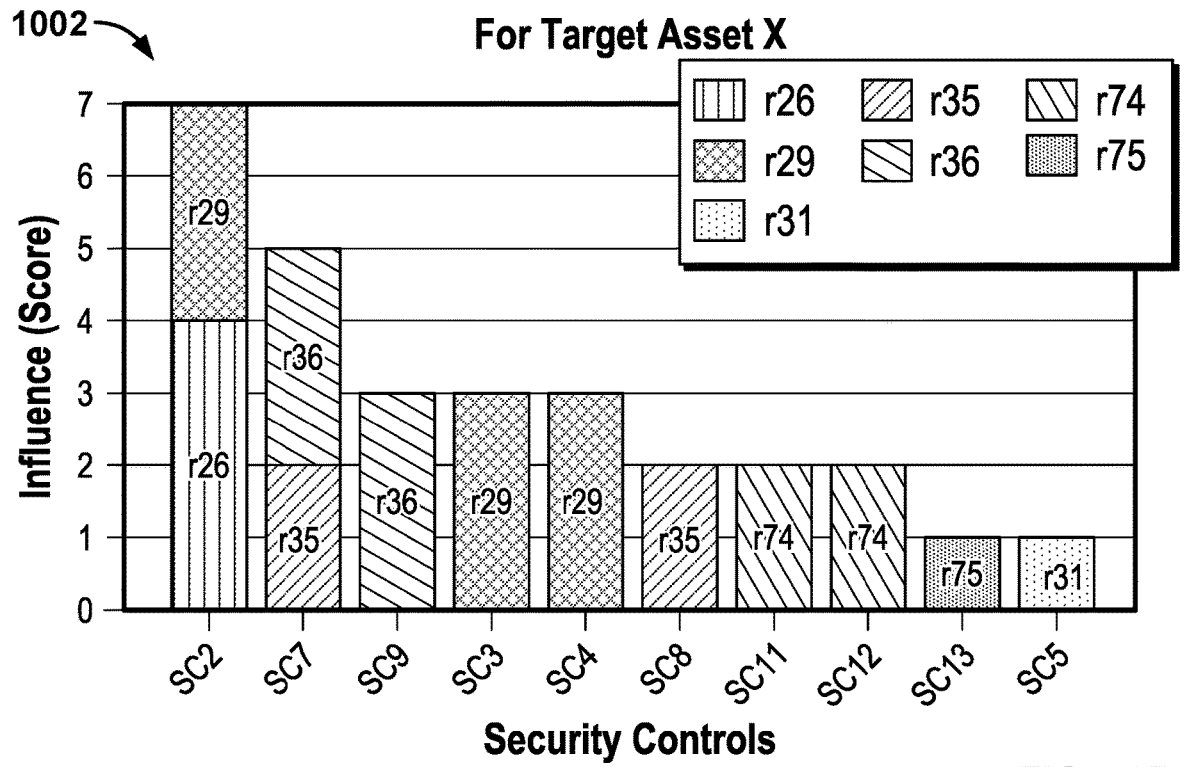
Figure 10C:
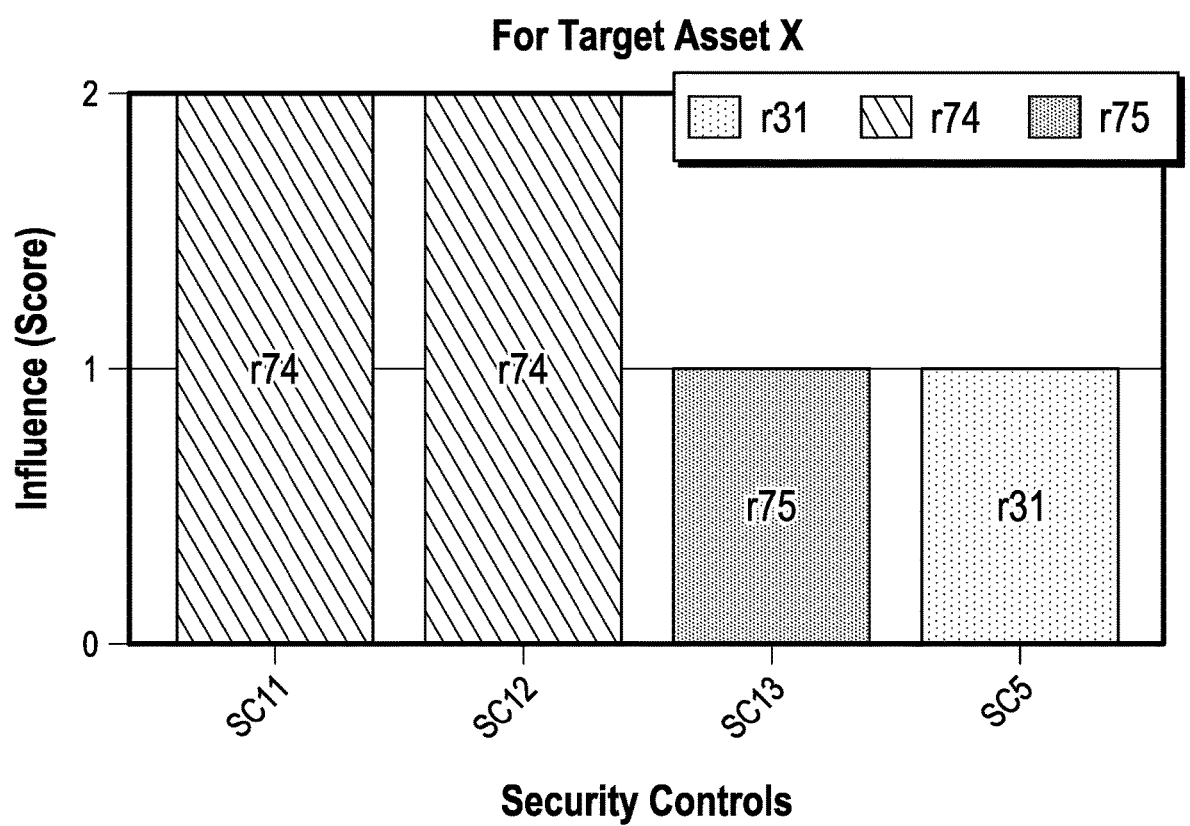

Implementations of the present disclosure were evaluated through execution of an experiment. The experiment was conducted on virtual network of four active servers. One of the servers had Internet access as a starting point for an attacker. Each server had a Microsoft Windows workstation connected to a Microsoft Active Directory. In the experiments, the environment (enterprise network) was contaminated with a set of vulnerabilities that can be exploited by MITRE ATT&K™ tactics for Active Directory environments. The attack target was defined as the domain controller (DC) server denoted as target X herein. FIGS. 9A-9C depict an evolution of an example AAG over multiple iterations of the experiment. FIGS. 10A-10C depicts an evolution of an influence histogram corresponding to the example AAGs of FIGS. 9A-9C. The experiment included a simulation employing two iterations. The first iteration employed the AUC reduction method, and the second iteration employed the Gradient reduction method. The sequence of reduction techniques was chosen according to the shape of the influence histograms.

The overall reduction results achieved in the experiment are depicted in FIGS. 9A-9C and 10A-10C. In the experiment, the notations of $SC_1$, $SC_2$, . . . , $SC_{15}$ are used to identify different SCs. A mapping is provided that maps attack tactics to corresponding SCs. The purpose of the depicted reduction steps is to minimize the number of possible pathways a hacker can traverse through a computer network, with the goal of ideally eliminating all paths to the DC server (i.e., target, crown jewel).

With particular reference to FIGS. 9A and 10A, an original state is provided and an AAG 900 is generated. The AAG 900 of FIG. 9A represents the original estimation of the SC gap. In the depicted example, the AAG 900 is a three-dimensional representation of the enterprise network in terms of nodes and edges between nodes. Shapes are used for discerning types of a nodes (e.g., spherical nodes represent facts, pyramid nodes represent rules, cubical nodes represent impacts). The AAG 900 of FIG. 9A includes 268 attack nodes, of which 159 are rule nodes representing SCRs, 324 edges, and an overall GRV of 6.108. The influence histogram 1000 of FIG. 10A represents the starting condition, which includes fifteen SCs that need improvement or are missing. The order of SCs from left to right indicates the prioritization of which SC impacts the cyber posture more and should be handled first.

With particular reference to FIGS. 9B and 10B, a first state is represented after execution of a first iteration. An influence histogram 1002 of FIG. 10B represents the result of applying the first reduction method of AUC with a configuration parameter of 0.4 (indicating 40% area selection). Accordingly, based on the measured data, three SCs with the highest distribution, enumerated as $SC_{15}$, $SC_6$, $SC_{10}$, are removed along with two additional SCs, namely $SC_1$, $SC_{14}$. This results in the removal of respective rule nodes from the AAG 900 of FIG. 9A to provide an AAG 902 (residual AAG) of FIG. 9B. The AAG 902 in hand with the influence histogram 1002 indicate that ten SCs remain after the first iteration. The AAG 902 is much smaller than the AAG 900, now including 146 nodes, of which sixty are rule nodes representing SCRs, 168 edges, and a GRV of 1.624. As a result, a decay ratio of 73% in GRV and 62% decay ratio of SCRs were achieved.

With particular reference to FIGS. 9C and 10C, in the second iteration, the Gradient reduction method was applied with gradient value of 0.61, which eliminated $SC_2$ and $SC_7$. Since SCs $SC_9$, $SC_3$, $SC_4$, $SC_8$ include the same rules as $SC_2$ and $SC_7$, they were also removed from the inherited AAG containing four residual SCs. This results in the removal of respective rule nodes from the AAG 902 of FIG. 9B to provide an AAG 904 (residual AAG) of FIG. 9C. The AAG 904 in hand with the influence histogram 1004 indicate that four SCs remain after the second iteration. The AAG 904 is smaller than the AAG 902 and includes ninety nodes, of which thirty-four are rule nodes representing SCRs, ninety-five edges, and an overall GRV of 1.02. As a result, an overall a decay ratio of 37% in GRV, and 43% decay ratio of SCRs, were achieved.

In this example, the remaining four SCs represented in the histogram 1004 include mandatory SCs, namely SCs that cannot be addresses either due to limitations of real systems, or lack of existing SCs at all, indicating a need for future investment. As such, the simulator highlights the order of SCs to be optimized due to lack of tuned implementation, and ones that are needed to be implemented in the future.

In the simulation of the experiment, automatic reduction methods were employed. It can be noted that other selectin criteria can be used, such as Top K and customized selection. The Gradient, AUC, and Top K methods are targeted to remove the most impacting SCs and the custom selection method is aimed at performing manual adjustments.

Figure 11:
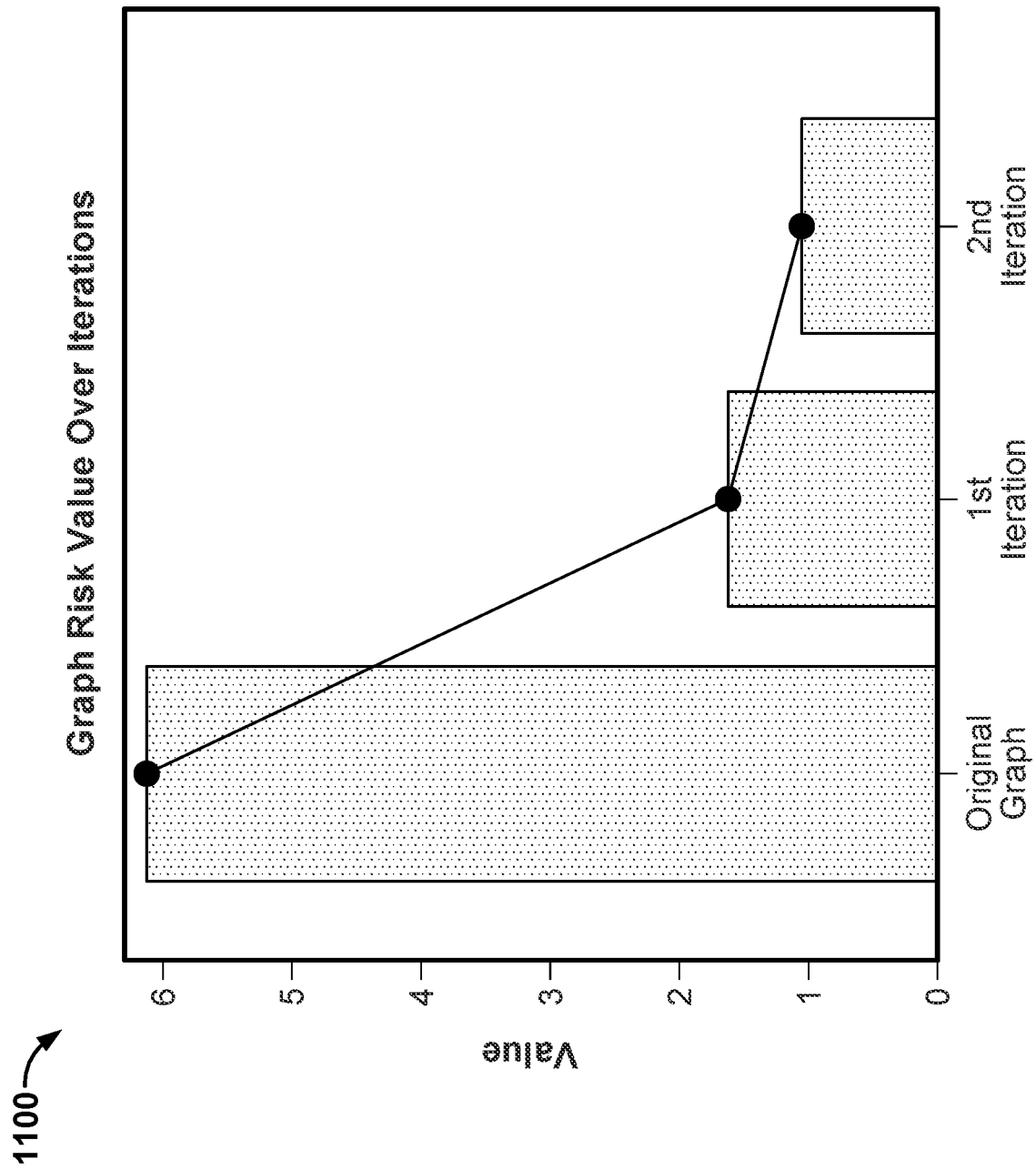
FIG. 11 depicts a graph depicting an example graph risk value decay over iterations in accordance with implementations of the present disclosure.

FIG. 11 depicts a graph 1100 representing the decrease of GRV over the simulation for the example experiment. The graph 1100 illustrates how AAG residual risk is decayed over time, and the level of hackability is reduced once the proposed SCs are implemented. As such, several different decaying method combinations can be explored, in order to find the best decaying curve amongst various decaying methods.

In accordance with implementations of the present disclosure, sub-sets of security controls can be implemented in the enterprise network based on the results of a simulation. For example, and as described herein, each simulation provides a series of sub-sets of security controls and a resulting profile for decrease in GRV. In some examples, at least partially in response to a profile for decrease in GRV, a series of sub-sets of security controls can be implemented in the enterprise network that is represented by the AAG to mitigate cyber risk in the enterprise network. For example, and with reference to the experiment detailed above, a first sub-set of security controls (e.g., $SC_{15}$, $SC_6$, $SC_{10}$) can be initially implemented in the enterprise network, and a second sub-set of security controls (e.g., $SC_2$, $SC_7$) can be subsequently implemented in the enterprise network.

As described herein, the CDT platform of the present disclosure provides an approach to automatically gather SCRs based on current security exposure of an enterprise network by analyzing a unique digital twin at least partially provided as an AAG. Implementations of the present disclosure also provide for simulating the implementation of SCs in view of identified SCRs in order to assess their impact on the overall cyber risk reduction of the attack surface. The digital twin of the present disclosure combines detailed information about network assets such as computers, user accounts, firewall rules, and such, with associated known attack tactics.

Further, implementations of the present disclosure provide a simulator that evaluates a proportion of each SC's contribution to the cyber-attack pathways and provides multiple methods to simulate attack surface reduction through potential implementation of SCs. Accordingly, the simulator enables automatic gathering of SCRs that represent where SCs can be implemented, and enables fast reduction of cyber impact and an ordered prioritization of SCs to optimize, followed by constrained or missing security controls for future implementation. The simulator also provides transparency for decision makers regarding the impact of separate SCs and potential risk decay by selecting the order of SCRs and enabling a "what-if" simulation for evaluating the speed of risk reduction. The simulations may be used as a valuable tool in cyber security existing spending and future budget analysis by proposing what needs to be fixed now with employed SCs, and which SCRs, for which SCs are absent.

This section describes how attack graphs could be integrated with a public knowledge graph (KG) such as D3FEND KG, and how advanced analytics over the attack graph enables automated recommendation of relevant security controls. In some examples, the KG can be a defensive model of a D3FEND framework. A D3FEND KG is a catalog of defensive cybersecurity techniques and their relationships to offensive/adversary techniques.

Figure 12:
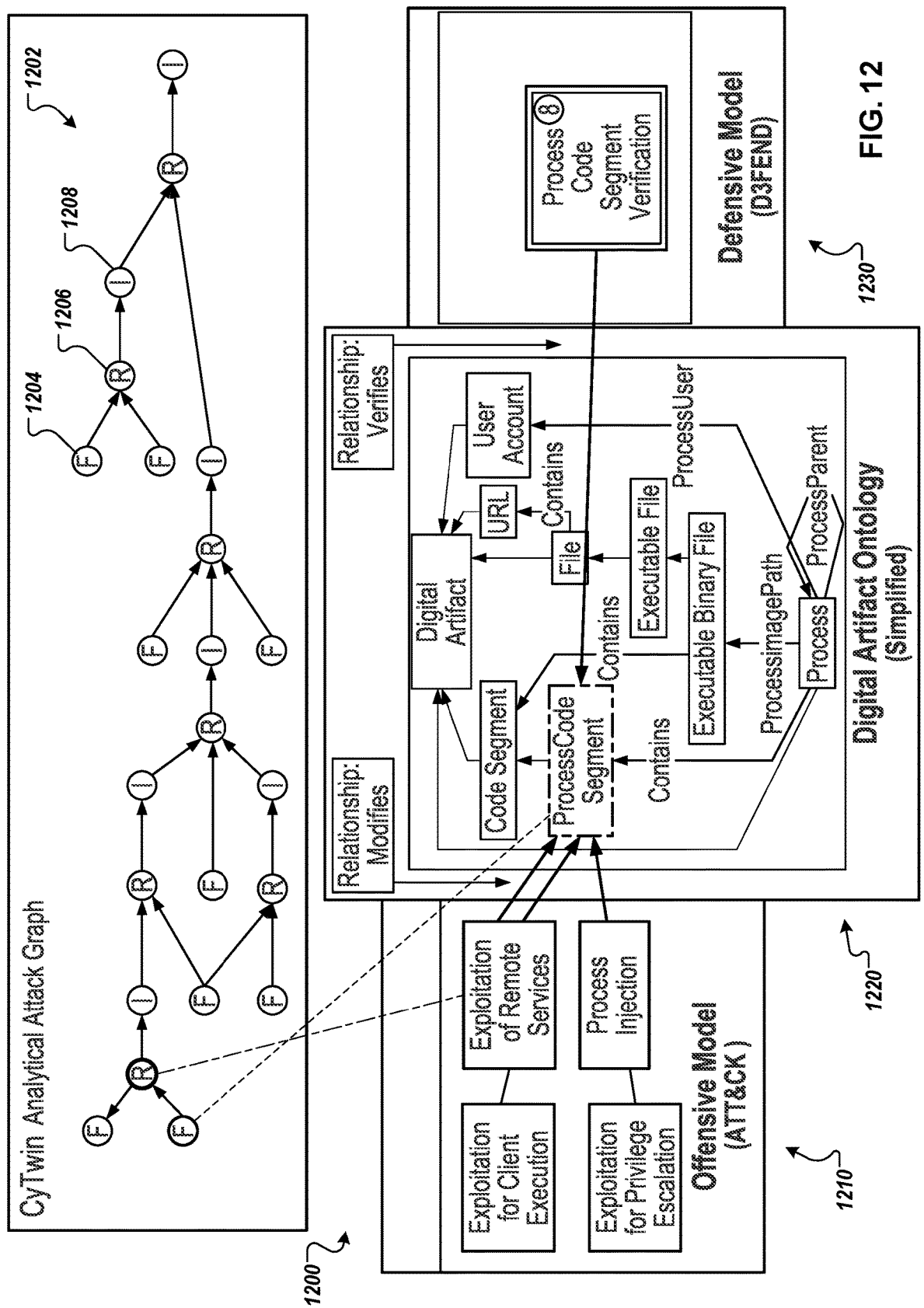
FIG. 12 is a diagram depicting integration of information with an AAG.

FIG. 12 provides conceptualization diagram 1200 of how information can be integrated. The AAG 1202 includes node types of fact nodes 1204, impact nodes 1206, and rule nodes 1208. In some examples, a fact node indicates facts that are provided as input within a configuration. In some examples, impact nodes indicate a derived fact that results from applying one or more input facts and/or one or more derived facts to a rule. A fact node can represent a system or network configuration that is a condition that provides possibilities for actions by an attacker, Every rule type 1208 is mapped to one or more MITRE attack tactic 1210, and every tactic 1210 is mapped to one or more rule type 1208. Furthermore, every fact 1204 and impact 1206 type have mapping to one or more digital artifact 1220, or asset. Each attack tactic 1210 has relation with at least one digital artifact 1220 and each digital artifact 1220 has relation with relevant security controls 1230. Therefore, given an algorithm that returns the most impactful nodes over the AAG 1202, this integration allows automatic detection of relevant security controls 1230 from the KG.

Figure 13:
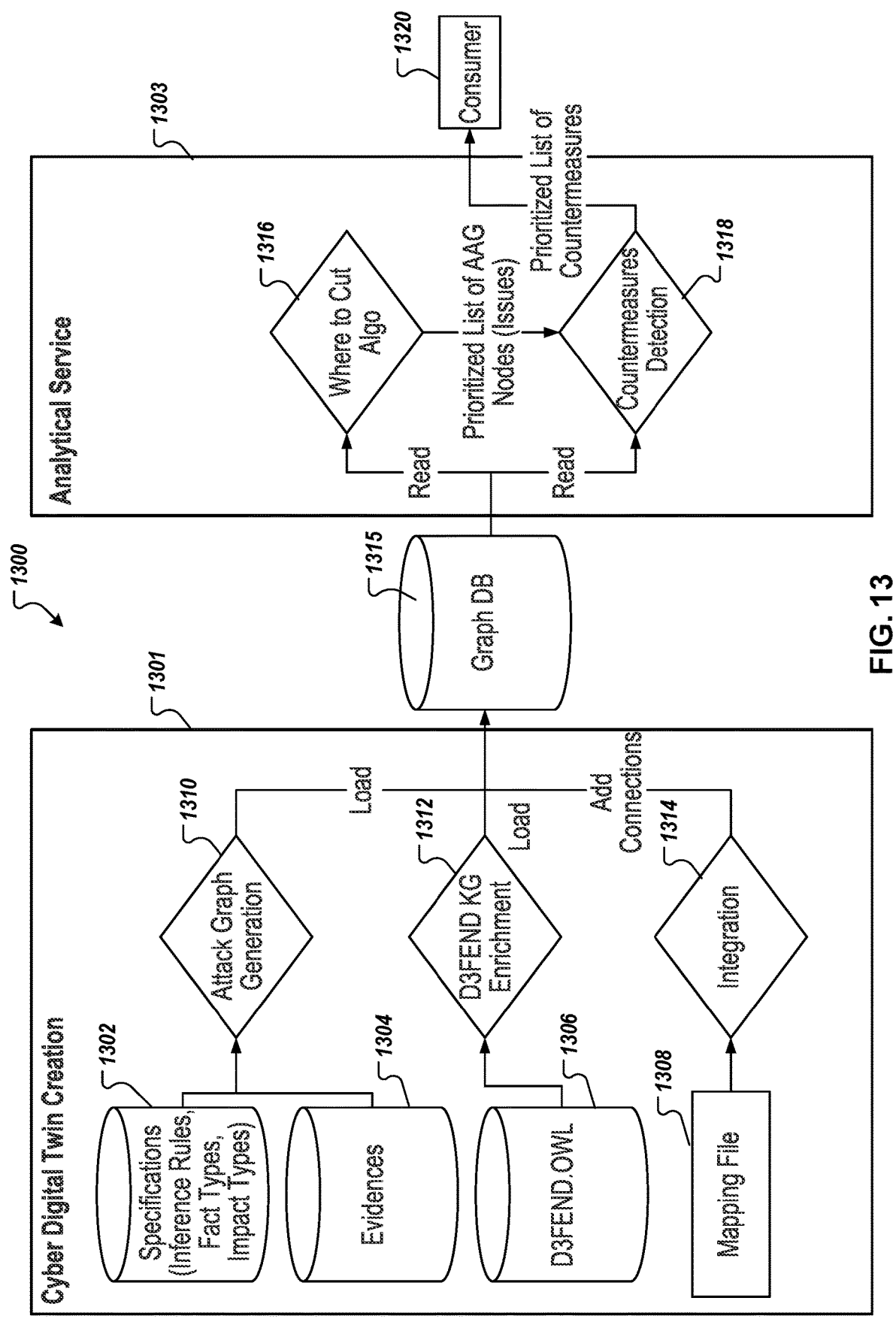
FIG. 13 depicts an example architecture of the disclosed techniques.

FIG. 13 depicts a diagram of an example architecture 1300 of the disclosed techniques. The architecture 1300 includes a cyber digital twin creation system 1301 and an analytical service 1303. The cyber digital twin creation system 1301 obtains specifications 1302. The specifications 1302 include inference rules, fact types, and impact types. The cyber digital twin creation system 1301 obtains evidences 1304. The cyber digital twin creation system 1301 generates 1310 an AAG from the specifications 1302 and evidences 1304.

The cyber digital twin creation system 1301 obtains a KG 1306. The cyber digital twin creation system 1301 performs a KG enrichment 1312 of the AAG by integrating 1314 the KG with the AAG. The cyber digital twin creation system 1301 integrates 1314 the KG with the AAG using a mapping file 1308. The mapping file 1308 includes data identifying connections between AAG node types and concepts from the KG. In some examples, the connections between the AAG node types and the KG concepts can be mined automatically, e.g. using natural language processing techniques. In some examples, the connections between the AAG node types and the KG concepts can be manually modelled by a user.

The integration 1314 includes adding connections between the AAG and the KG based on the mapping file 1308. A graph database 1315 loads the AAG, the KG, and the mapped connections between the AAG and the KG. The integrated AAG is stored in a graph database 1315.

The analytical service 1303 reads graph data from the graph database 1315. The analytical service 1303 applies a where to cut algorithm 1316. The analytical service 1303 prioritizes a list of AAG nodes using the where to cut algorithm 1316. The analytical service 1303 detects countermeasures 1318 using the prioritized list of AAG nodes. The analytical service 1303 prioritizes the countermeasures, e.g., security controls, based on the prioritized list of AAG nodes. The analytical service 1303 provides the prioritized list of countermeasures to a consumer 1320.

Figure 14:
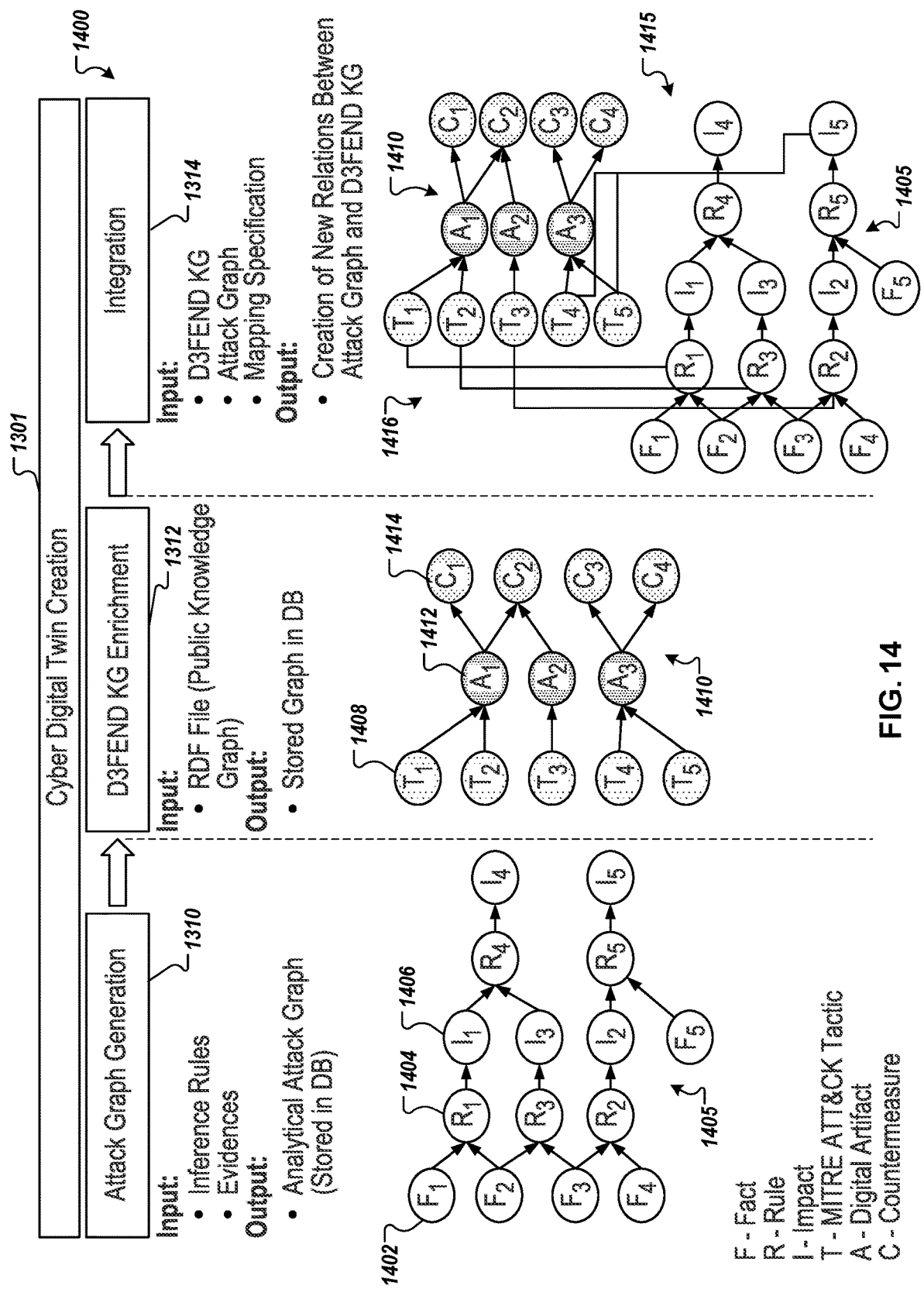
FIG. 14 depicts an example process for integration of a public knowledge graph with an AAG.

FIG. 14 depicts an example process 1400 for integration of a public knowledge graph with an AAG. The process 1400 can be performed by the cyber digital twin creation system 1301. The process 1400 includes obtaining specifications that can include inference rules 1404, fact types 1402, and impact types 1406. The process 1400 also includes obtaining evidences collected from the network, such as fact instances.

The process 1400 includes generating 1310 an AAG 1405. The AAG 1405 can be extended to the form of a process-aware attack graph, or integrated AAG 1415. The example shown in FIG. 14 shows that five evidences, or facts (F) 1402 collected from the system trigger five instantiations of rules (R) 1404 that create five potential impacts (I) 1406.

The process 1400 includes obtaining a publicly available OWL/RDF file of the KG 1410, and importing the KG 1410 to a graph database, e.g. graph database 1315. The example shown in FIG. 14 shows that five attack tactics (T) 1408 are related to three digital artifacts (A) 1412, that could be protected by four security controls, or countermeasures (C) 1414.

The process 1400 includes obtaining a mapping specification, e.g., mapping file 1308, between elements of the KG 1410 and elements of the AAG 1405, and creating relationships within the graphs. The mapping includes connections 1416 between rule types 1404 and attack tactics 1408, between fact types 1402 and digital artifacts 1412, and between impact types 1406 and digital artifacts 1412.

The example integrated AAG 1415 shown in FIG. 14 includes mapped connections between rules instances within the AAG 1405 and attack tactics within the KG 1410. This can be done by creating a new edge between each rule instance node to an attack tactic node according to a predefined mapping between rule types and attack tactics. A process for detailed mapping between nodes of the graphs can include mapping each rule 1404 to a MITRE attack tactic 1408 during design time, since rules can express attack tactics.

Digital assets, or artifacts 1412 can represent configuration items such as application software, machines, files, etc. Facts 1402 represent pieces of information collected from individual configuration items. Facts 1402 can be defined within the context of digital assets ontology. For instance, 'Service Application' and 'Host' are entities within the digital asset ontology. An example for a fact that enables spotting an attack is 'Service Access.' This fact expresses whether its executable path may be modified by an adversary. This fact can be connected within the attack graph to 'Service Application' and 'Host' entities within the KG 1410. The same is applicable for impacts that represent how implementation of an attack tactic could affect these digital assets.

The Digital Artifact Ontology and Defensive model can be extended by adding constraints that apply to specific asset/remediation pair. An example constraint is a maintenance schedule of a specific machine, which prevents restart for security update installation. At a pipeline plant, a maintenance window may constitute, for example, a few hours a year.

Figure 15:
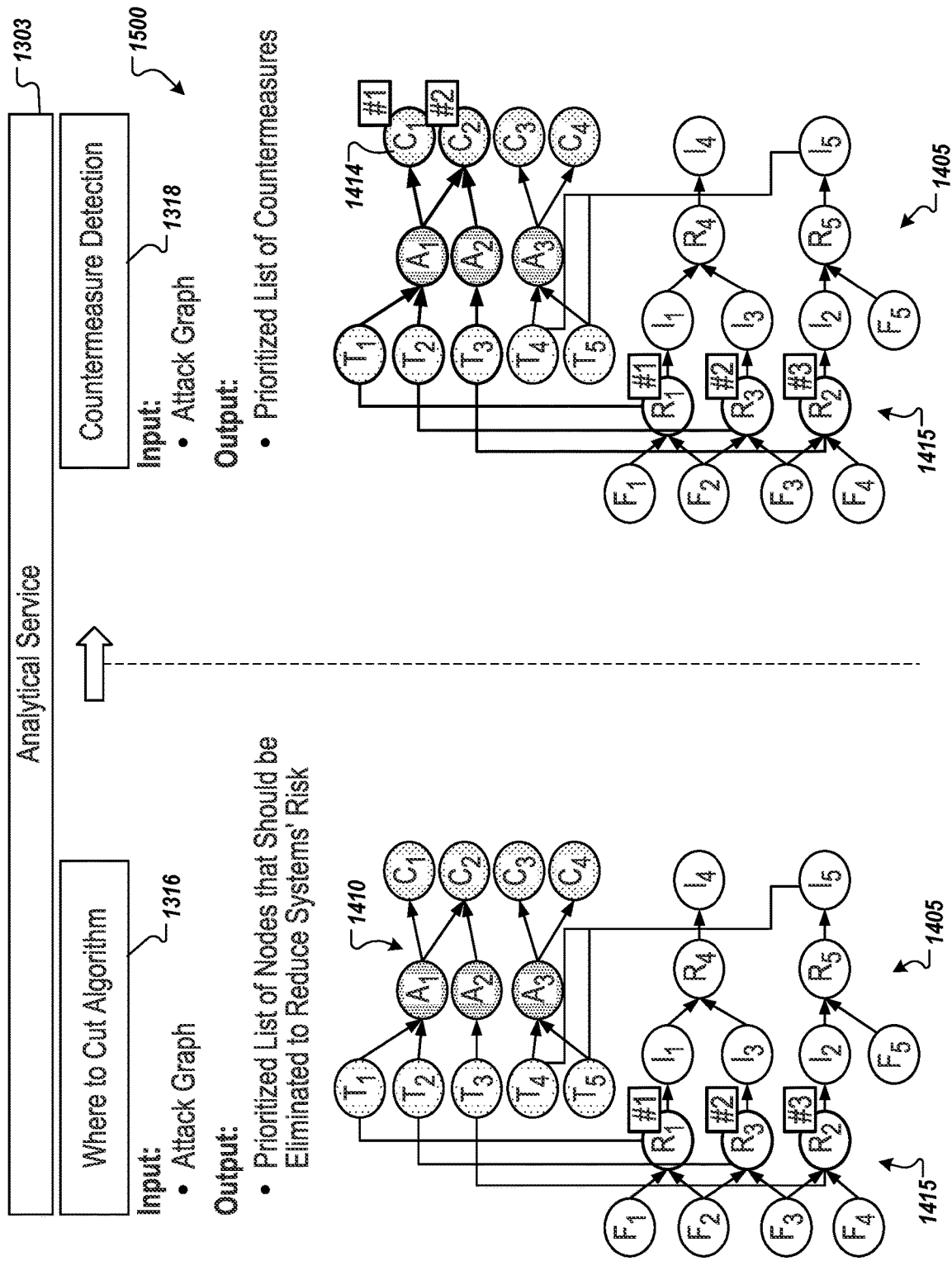
FIG. 15 depicts an example process for prioritizing security controls using a public knowledge graph.

FIG. 15 depicts an example process 1500 for prioritizing security controls using a public knowledge graph, e.g., KG 1410. In general, the process 1500 includes obtaining an AAG and generating a prioritized list of nodes that should be eliminated to reduce a systems' risk. The example shown in FIG. 15 shows that addressing issues related to nodes R1, R2, R3 will eliminate the graph and reduce the cyber risk.

After the construction of the AAG and the alignment of each AAG node to its counterpart in the KG, as in the process 1400, the analytical service 1303 can run a where-to-cut algorithm 1316 over the AAG 1405. The where-to-cut algorithm can include using a mitigation simulator to simulate facts removal. In some examples, nodes of the AAG 1405 can be prioritized by calculating the importance of fact nodes of the AAG 1405. The importance can be calculated, for example, using a reverse eigenvector centrality to calculate importance scores. Fact nodes of the AAG 1405 with higher importance scores can be prioritized over fact nodes with lower importance scores. Prioritization of AAG nodes is further described in U.S. Ser. No. 17/675,330, the disclosure of which is expressly incorporated herein by reference in the entirety.

Results of the where-to-cut algorithm 1316 include a prioritized list of AAG nodes, or issues that should be addressed in order to mitigate the risk to the system. Then, for each issue, the integration of the AAG 1405 with KG 1410 is leveraged to detect relevant security controls.

Attack tactics observed in the integrated attack graph 1415 can be mitigated using various security controls. Thus, the process 1500 includes identifying a subset of the most effective security controls through countermeasure detection 1318. This can be done in various ways. For example, security controls, or countermeasures 1414, can be prioritized by an amount of issues, or nodes, in the AAG 1405 that the security controls can resolve. This could be done by running a reachability analysis from each security control to the AAG rule nodes returned by the where-to-cut algorithm 1316. Then, countermeasures with higher reachability will be prioritized.

Reachability analysis can be performed by finding shortest paths between each KG node and the AAG rule nodes. Reachability analysis can be performed, for example, using Dijkstra's algorithm for finding the shortest paths between nodes in a graph. Countermeasures, or security controls, with higher numbers of shortest paths to AAG nodes can be assigned a higher reachability, and can be prioritized over countermeasures with lower numbers of shortest paths to AAG nodes. The results of countermeasure detection 1318 includes a prioritized list of countermeasures.

Figure 16:
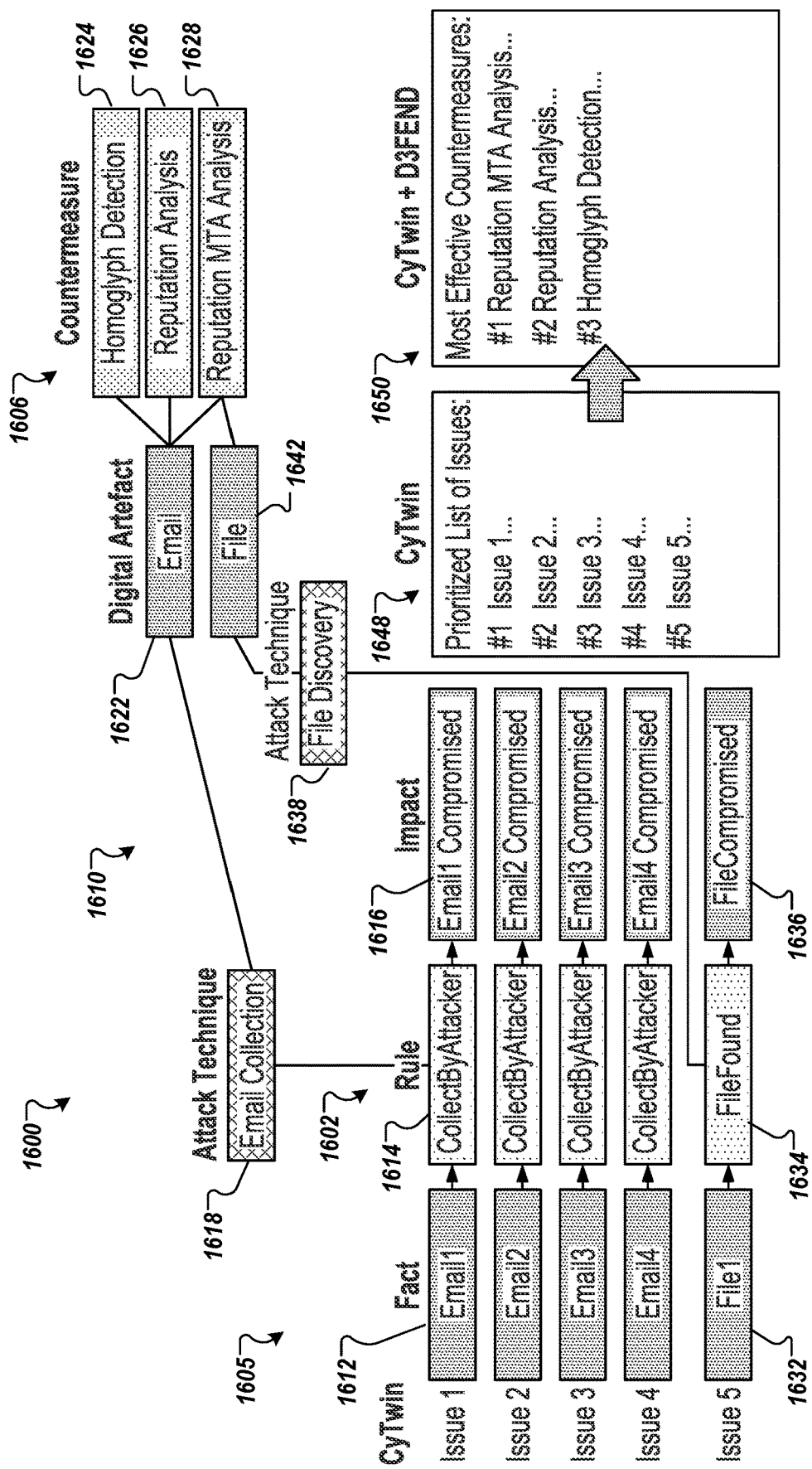
FIG. 16 depicts results of example prioritization of security controls.

FIG. 16 depicts results of example integrated AAG 1600 for performing prioritization of security controls. In some examples, security controls represented by countermeasure nodes 1606, can be prioritized by their residual risk. In some examples, risk prediction methodology can be applied to an integrated AAG to predict the system's risk. In an iterative process, at every step a greedy search can be performed to detect the security control with the maximal risk reduction. For example, the security control with the maximal risk reduction can be the security control that removes the set of AAG rule nodes 1602 that reduces the risk the most. Then, the process includes removing the security control's related issues, or nodes, from the AAG, until risk is reduced to an acceptable level.

The example integrated AAG 1600 includes an AAG 1605 integrated with a KG 1610. In the example integrated AAG 1600, issue 1 includes a fact node of Email1 1612, a rule node of CollectbyAttacker 1614, and an impact node of Email1 Compromised 1616. The integrated AAG 1600 includes a connection between the rule node of Collectbyattacker 1614 an attack technique, or tactic node, of Email Collection 1618. The tactic node of Email Collection 1618 is connected to a digital artifact node of Email 1622. The digital artifact node of Email 1622 is connected to countermeasure nodes 1606 of Homoglyph Detection 1624, Reputation Analysis 1626, and Reputation Message Transfer Agent (MTA) Analysis 1628.

In the example integrated AAG 1600, issue 5 includes a fact node of File1 1632, a rule node of FileFound 1634, and an impact node of FileCompromised 1636. The integrated AAG 1600 includes a connection between the rule node of FileFound 1634 and an attack technique, or tactic node of File Discovery 1638. The tactic node of File Discovery 1638 is connected to a digital artifact node of File 1642. The digital artifact node of File 1642 is connected to the countermeasure node of Reputation MTA Analysis 1628.

The analytical service 1303 prioritizes the list of AAG nodes, or issues. In the example of FIG. 16, issue 1 has a highest priority and issue 5 has a lowest priority of the list of issues 1648. The analytical service 1303 performs countermeasure detection to detect countermeasures for the list of issues 1648. The analytical service 1303 determines a prioritized list of countermeasures 1650. The prioritize list of countermeasures 1650 includes Reputation MTA Analysis 1628 having a highest priority, Reputation Analysis 1626 having a second highest priority, and Homoglyph Detection 1624 having a third, lowest priority.

As described with reference to FIG. 15, countermeasure prioritization can be performed using various criteria. In some examples, countermeasures can be prioritized based on the number of fact nodes of the AAG that are resolved by the countermeasures. For example, a first countermeasure that resolves more AAG nodes can be prioritized over a second countermeasure that resolves fewer AAG nodes. In some examples, countermeasures can be prioritized based on achieving a specified amount of risk reduction while reducing or minimizing the number of actions required. In some examples, countermeasures can be prioritized based on achieving a specified amount of risk reduction while reducing or minimizing the cost required.

In some examples, the subset of prioritized security controls can be consumed by a system that automates the repair. In some examples, a list of the subset of prioritized security controls can be provided to a user. Furthermore, given a set of constraints, a remediation plan can be formulated as an optimization problem in order to offer a solution that takes into account business constraints of performing security remediation.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for mitigating cyber security risk of an enterprise network, the computer-implemented method comprising:
   receiving an analytical attack graph (AAG) representing paths within the enterprise network with respect to at least one target asset, the AAG at least partially defining a digital twin of the enterprise network and comprising a set of rule nodes, each rule node of the set of rule nodes representing an attack tactic of a plurality of attack tactics that is used to move along a path of the AAG;
   integrating the AAG with a knowledge graph (KG) comprising a set of asset nodes and a set of tactic nodes, each asset node of the set of asset nodes representing a digital asset that is affected by one or more of the plurality of attack tactics and each tactic node of the set of tactic nodes representing a tactic for attacking the digital asset of the enterprise network, wherein integrating the AAG with the KG comprises mapping each rule node of the set of rule nodes to a respective tactic node of the set of tactic nodes of the KG;
   determining, based on integrating the AAG with the KG, a plurality of security controls, each security control of the plurality of security controls having an assigned priority value; and
   selectively implementing one or more security controls of the plurality of security controls in the enterprise network based at least partially on the assigned priority values of the plurality of security controls.

2. The method of claim 1, wherein the AAG comprises a set of impact nodes, each impact node of the set of impact nodes representing an impact of the attack tactic of the plurality of attack tactics on the at least one target asset.

3. The method of claim 2, wherein integrating the AAG with the KG comprises mapping each impact node of the set of impact nodes to an asset node of the set of asset nodes of the KG.

4. The method of claim 1, wherein the AAG comprises a set of fact nodes, each fact node of set of fact nodes indicating a condition of the enterprise network.

5. The method of claim 4, wherein integrating the AAG with the KG comprises mapping each fact node of the set of fact nodes to an asset node of the set of asset nodes of the KG.

6. The method of claim 1, wherein the KG comprises a set of countermeasure nodes, each countermeasure node of the set of countermeasure nodes representing a security control for mitigating risk to digital assets of the enterprise network.

7. The method of claim 1, wherein the KG comprises a public KG of a Detection, Denial, and Disruption Framework Empowering Network Defense (D3FEND) framework.

8. The method of claim 1, wherein the digital asset comprises a configuration item of the enterprise network.

9. The method of claim 1, wherein integrating the AAG with the KG comprises:
   accessing a mapping file indicating connections between AAG nodes and KG nodes; and
   determining connections between the AAG nodes and the KG nodes based on the mapping file.

10. The method of claim 1, wherein determining the plurality of security controls, each security control of the plurality of security controls having an assigned priority value comprises:
    prioritizing the rule nodes of the set of rule nodes of the AAG;
    determining, based on integrating the AAG with the KG, a connection between each rule node of the AAG and a respective countermeasure node of a set of countermeasure nodes of the KG; and
    prioritizing the countermeasure nodes of the set of countermeasure nodes of the KG based on the connection between the rule nodes of the AAG and the countermeasure nodes of the KG.

11. The method of claim 1, wherein selectively implementing the one or more security controls of the plurality of security controls in the enterprise network comprises:
    providing a set of remediation actions based on the assigned priority values of the plurality of security controls; and
    executing at least one remediation action in the set of remediation actions to mitigate risk to the enterprise network.

12. A system comprising:
    one or more computers; and
    one or more storage devices storing instructions that are operable, when executed by the one or more computers, to cause the one or more computers to perform operations for mitigating cyber security risk of an enterprise network, the operations comprising:
       receiving an analytical attack graph (AAG) representing paths within the enterprise network with respect to at least one target asset, the AAG at least partially defining a digital twin of the enterprise network and comprising a set of rule nodes, each rule node of the set of rule nodes representing an attack tactic of a plurality of attack tactics that is used to move along a path of the AAG;
       integrating the AAG with a knowledge graph (KG) comprising a set of asset nodes and a set of tactic nodes, each asset node of the set of asset nodes representing a digital asset that is affected by one or more of the plurality of attack tactics and each tactic node of the set of tactic nodes representing a tactic for attacking the digital asset of the enterprise network, wherein integrating the AAG with the KG comprises mapping each rule node of the set of rule nodes to a respective tactic node of the set of tactic nodes of the KG;
       determining, based on integrating the AAG with the KG, a plurality of security controls, each security control of the plurality of security controls having an assigned priority value; and
       selectively implementing one or more security controls of the plurality of security controls in the enterprise network based at least partially on the assigned priority values of the plurality of security controls.

13. The system of claim 12, wherein the AAG comprises a set of impact nodes, each impact node of the set of impact nodes representing an impact of the attack tactic of the plurality of attack tactics on the at least one target asset.

14. The system of claim 13, wherein integrating the AAG with the KG comprises mapping each impact node of the set of impact nodes to an asset node of the set of asset nodes of the KG.

15. The system of claim 12, wherein the AAG comprises a set of fact nodes, each fact node of the set of fact nodes indicating a condition of the enterprise network.

16. The system of claim 15, wherein integrating the AAG with the KG comprises mapping each fact node of the set of fact nodes to an asset node of the set of asset nodes of the KG.

17. A non-transitory computer-readable medium storing software comprising instructions executable by one or more computers which, upon such execution, cause the one or more computers to perform operations for mitigating cyber security risk of an enterprise network, the operations comprising:

receiving an analytical attack graph (AAG) representing paths within the enterprise network with respect to at least one target asset, the AAG at least partially defining a digital twin of the enterprise network and comprising a set of rule nodes, each rule node of the set of rule nodes representing an attack tactic of a plurality of attack tactics that is used to move along a path of the AAG;

integrating the AAG with a knowledge graph (KG) comprising a set of asset nodes and a set of tactic nodes, each asset node of the set of asset nodes representing a digital asset that is affected by one or more of the plurality of attack tactics and each tactic node of the set of tactic nodes representing a tactic for attacking the digital asset of the enterprise network, wherein integrating the AAG with the KG comprises mapping each rule node of the set of rule nodes to a respective tactic node of the set of tactic nodes of the KG;

determining, based on integrating the AAG with the KG, a plurality of security controls, each security control of the plurality of security controls having an assigned priority value; and selectively implementing one or more security controls of the plurality of security controls in the enterprise network based at least partially on the assigned priority values of the plurality of security controls.

* * * * *